United States Patent [19]
Kato et al.

[11] Patent Number: 6,070,205
[45] Date of Patent: May 30, 2000

[54] HIGH-SPEED PROCESSOR SYSTEM HAVING BUS ARBITRATION MECHANISM

[75] Inventors: Shuhei Kato; Koichi Sano, both of Kusatsu, Japan

[73] Assignee: SSD Company Limited, Kusatsu, Japan

[21] Appl. No.: 09/019,277

[22] Filed: Feb. 5, 1998

[30] Foreign Application Priority Data

Feb. 17, 1997 [JP] Japan ................................. 9-049758
May 6, 1997 [JP] Japan ................................. 9-132800

[51] Int. Cl.[7] ........................... G06F 13/40; G06F 13/38; G06F 13/14
[52] U.S. Cl. ........................... 710/100; 710/126
[58] Field of Search ................... 710/100, 107, 710/60, 126, 128, 129, 101, 110; 713/600; 709/209, 250; 370/402, 462

[56] References Cited

U.S. PATENT DOCUMENTS

| | | | |
|---|---|---|---|
| 4,698,753 | 10/1987 | Hubbins et al. | 709/209 |
| 5,280,587 | 1/1994 | Shimodaira et al. | 713/600 |
| 5,668,956 | 9/1997 | Okazawa et al. | 710/126 |
| 5,729,703 | 3/1998 | Onn et al. | 710/126 |
| 5,764,895 | 6/1998 | Chung | 709/250 |
| 5,809,259 | 9/1998 | Mitsuishi | 710/126 |

*Primary Examiner*—Gopal C. Ray

[57] ABSTRACT

A high-speed processor system having a bus arbitration mechanism constructed on a single semiconductor chip. The processor system comprises at least one bus master, a plurality of buses and a plurality of bus slaves. Each bus comprises an independent address bus, an independent data bus and individual data transfer capability. Every bus master comprises a plurality of independent bus interfaces each connected to one of the buses. Each bus slave is connected to a bus that has corresponding data transfer capability. For a system having more than two bus masters, the system further comprises a plurality of bus arbitrators for arbitrating the access of each bus independently. The bus arbitrator receives a bus request signal from each bus master that requests the bus access and issues a bus grant signal to the bus master allowed to access the bus. The bus arbitrator comprises a plurality of priority order information storage devices for storing priority order information for all the bus masters connected to the bus. At every bus cycle, one set of priority order information is selected continuously and cyclically. When more than one bus master requests the bus access at the same time, the bus arbitrator determines which bus master may access the bus according to selected priority order information.

21 Claims, 22 Drawing Sheets

| count value of bus cycle counter | pirority order information |
|---|---|
| 0 | 0 |
| 1 | 3 |
| 2 | 1 |
| 3 | 3 |
| 4 | 0 |
| 5 | 3 |
| 6 | 2 |
| 7 | 3 |
| 8 | 0 |
| 9 | 3 |
| 10 | 2 |
| 11 | 3 |
| 12 | 0 |
| 13 | 3 |
| 14 | 2 |
| 15 | 3 |

FIG. 15

| priority order information | first priority order | second priority order | third priority order | fourth priority order |
|---|---|---|---|---|
| 0 | bus master A | bus master B | bus master C | bus master D |
| 1 | bus master B | bus master A | bus master C | bus master D |
| 2 | bus master C | bus master A | bus master B | bus master D |
| 3 | bus master D | bus master A | bus master B | bus master C |

FIG. 16

| count value of bus cycle counter | pirority order information |
|---|---|
| 0 | 1 |
| 1 | 3 |
| 2 | 1 |
| 3 | 2 |
| 4 | 1 |
| 5 | 3 |
| 6 | 1 |
| 7 | 0 |

FIG. 22

HIGH-SPEED PROCESSOR SYSTEM HAVING BUS ARBITRATION MECHANISM

FIELD OF THE INVENTION

The present invention relates generally to processor systems constructed on a single semiconductor chip comprising bus masters, buses and bus slaves, more particularly to single-chip processor systems having a plurality of bus masters and bus arbitration mechanisms for arbitrating common bus access among bus masters. It can be used for systems such as video game machines, network terminals, PDA (personal digital assistant), KARAOKE machines, car navigators, intellectual training toys, teaching materials, word processors, practical information servers, check machines in product line, measure machines and so on. A bus master is referred to as a function block capable of issuing a bus address, and a bus slave is capable of receiving a bus address.

BACKGROUND OF THE INVENTION

In recent years, the performance of processors has been significantly improved. The speed of memory and other peripheral devices, however, does not show such dramatic progress. In a typical process system, the central processor, memory and other devices share a common bus. The central processor usually serves as a bus master with the memory and other devices being the bus slaves. The speed gap between the bus master and bus slaves has presented a big problem that severely limits the performance of the system as a whole.

For a multiprocessor system, the problem becomes even more serious because the system has plural bus masters and they have to share a common bus. In the past few years, several approaches to solving this problem have been proposed and adopted in the industry. One popular approach involves the use of faster cache memories or local memories for individual masters. Another approach improves the data transfer over a common bus by using plural common buses in a system. A processor based on Harvard Architecture is an example that uses the multiple bus approach.

Harvard architecture has two external buses. One is for fetching instructions only and the other for accessing data only. Each bus has an independent physical address space. In a processor having Harvard architecture, instructions and data cannot be located in one physical address space. Therefore, it is more difficult to program than an ordinary von Neumann processor.

Another example having plural buses is a layered bus system often seen in a personal computer or an engineering workstation. At present, this type of system is not built on a single semiconductor chip. Nevertheless, it is a good example for comparing with a system according to the present invention. FIG. 1 illustrates a layered bus system used in a personal computer. As shown in the figure, there is a plurality of bus having different data transfer capability. The data transfer capability of a bus is usually measured by the product of the bus cycle speed and the bit width of the data bus.

An embodiment known in a recent study is a PC/AT-compatible machine comprising an Intel Pentium processor. There are three buses in the system. The specification of the data transfer capability in such a system is generally as follows:

Processor External Bus with 60 MHz or 66 MHz bus cycle and 64 bit data bus bandwidth.

PCI (Peripheral Component Interconnect) Bus with 33 MHz bus cycle and 32 bit data bus bandwidth.

ISA Bus with around 10 MHz bus cycle and 8/16 bit data bus bandwidth.

In this system, every bus slave is connected to one of the buses, according to its own access speed and data transfer rate. Semiconductor memories such as DRAM (Dynamic Random Access Memory) are connected to the Processor External Bus, peripheral devices requiring higher data transfer rate such as video processors are connected to the PCI Bus, and peripheral devices requiring lower data transfer rate such as magnetic memories are connected to the ISA Bus.

In such an architecture, bus masters including Pentium Processor directly access only Processor External Bus. Bus bridge units are required for the bus masters to access PCI Bus and ISA Bus as shown in FIG. 1. The bridge units comprises FIFO (first-in-first-out) memory buffers for the bus master to access data of a lower speed device through ISA Bus and PCI Bus. If a system includes FPU (Floating Point Unit) or another CPU as another bus master, they are connected to Processor External Bus. Bus arbitration among these bus masers is done only for Processor External Bus.

The system has a disadvantage that the bandwidth of the bus in a higher speed layer is wasted when the bus master accesses a bus in a lower speed layer. Another disadvantage is that complex circuit and extra memory such as FIFO memory are necessary in the bus bridge unit.

From the foregoing discussions of prior arts, it can be seen that although a multiprocessor system employing conventional multiple buses can eliminate some of the bandwidth problems between bus masters and bus slaves, the disadvantages as pointed out earlier make the conventional approach inappropriate for a single-chip multiprocessor system. There exists a strong need for having a more efficient bus architecture for a single-chip multiprocessor system.

In a multiprocessor system, a common bus plays an important role. It allows bus masters to share all bus slaves. If the bus slave on the common bus is a memory device, the memory space can be freely distributed to the bus masters. Nevertheless, it also presents a bus access problem. If the bus arbitration among bus masters is not done efficiently, the overall system performance may be greatly degraded. In order to avoid the deterioration of total system performance, the system may have to use extra memories such as local cache memories. Therefore, it is desirable that an efficient bus arbitration mechanism be built in a multiprocessor system. In the following, some conventional bus arbitration systems according to prior arts and their advantages and disadvantages are described.

Traditional methods for bus arbitration systems include Daisy Chain method, Polling method, Concurrent method having a priority encoder/decoder and so on. FIG. 2 shows a bus arbitration system that is implemented by the Daisy Chain method. As we can see, a plurality of bus masters A, B, C, . . . are in chains. In this architecture, each bus master has a right to access a bus after it obtains a bus grant signal from the bus master on its upper layer. Therefore, a bus master asserts a bus grant signal to the bus master on its lower layer while the former has no bus access request or the bus is available. In other words, the bus master on a lower layer can not have a bus access during one or more bus masters on its upper layer have a bus request or the bus is being used.

The Daisy Chain structure can be constructed by a simple circuit, and the priority level to each bus master can be preset according to the volume and important degree of the data to be processed by each bus master. However, as the number of the bus masters in the chain increases, the arbitrator significantly delays arbitration time and the system performance is deteriorated. In addition, the arbitrator can not guarantee to give bus cycles to the bus masters having lower priority. Furthermore, the priority level to each bus master is fixed and cannot be changed.

FIG. 3 illustrates a bus arbitration system that is implemented by the Concurrent method having a priority encoder/decoder. As shown in the figure, all bus masters A, B, C, ..., N send bus request signals to the priority encoder/decoder. After the bus is released, the priority encoder/decoder asserts the bus grant signal to the highest priority bus master according to a fixed priority.

This priority can be preset according to the volume and important degree of the data to be processed by each bus master. In this arbitration architecture, the arbitration time is fixed regardless of the number of bus masters. However, the arbitrator still can not guarantee to give bus cycles to the bus masters having lower priority. Furthermore, the priority level to each bus master is fixed and cannot be changed.

An arbitrator implemented by the Polling method can guarantee to give bus cycles to the bus masters having lower priority. The bus arbitrator cyclically detects each bus request signal issued by all bus masters. This detection is done for each bus master. Once an asserted bus request signal is detected, the bus arbitrator asserts the bus grant signal to the bus master. Each bus master can have a bus access when it gets the bus grant signal from the bus arbitrator.

The system can guarantee to give bus cycles to all bus masters. Every bus master can get a bus grant during certain period of time. However, a significant disadvantage of this method is similar to that of the Daisy Chain method. That is, as the number of the bus masters increases, the arbitrator significantly delays arbitration time and the system becomes less efficient. Furthermore, each bus master has the same priority level no matter how critical it has to access the bus.

In any of the arbitration systems described above, bus cycles are under the control of the bus master that is granted to access the bus. When a bus is granted to a bus master which has slower bus cycle speed, the slower bus cycle speed becomes the common bus cycle. This is also a key reason why the system performance deteriorates. Therefore, it is also important that a multiprocessor system can have an efficient bus arbitration mechanism that overcomes this drawback.

SUMMARY OF THE INVENSION

This invention has been made to overcome the above mentioned drawbacks and inefficiencies of a high-speed processor system. The primary object of the present invention is to provide a new architecture for a high-speed processor system. A second object is to provide an efficient bus arbitration mechanism for the high-speed processor system.

According to the present invention, the high-speed processor system comprises a plurality of common buses each having independent data transfer capability. There are more than one bus masters and a plurality of bus slaves in the system. Each bus master is connected to all common buses by means of a plurality of independent bus interfaces and each bus slave is connected to one common bus whose data transfer capability corresponds to that of the bus slave.

The architecture of this invention prevents the overall performance of a processor system from being deteriorated due to slower bus slaves. Thus, it is an object of the present invention to provide a high-speed processor system having a bus arbitration mechanism capable of optimizing bus utilization.

In a traditional layered bus system as shown in FIG. 1, the bus bridge units usually employ complex control circuit and FIFO memory. Furthermore, when a bus master accesses a bus in the lower layer, the bandwidth of a bus in the higher layer is wasted. In the system according to the present invention, no bus bandwidth is wasted. Because each bus master has plural independent bus interfaces to all common buses, it can access any common bus directly without passing through other buses. While a bus master is accessing one common bus, it also releases other common buses. In addition, the circuit size of the bus interface is quite smaller than the bus bridge unit shown in FIG. 1.

Another object of the invention is to provide a processor system architecture that maps plural physical address spaces of common buses onto a unified logical address space for a bus master. This architecture is suitable for using an ordinary von Neumann microprocessor as a bus master. In contrast to the Harvard architecture processor, the microprocessor can access instructions and data in any memory connected to any common bus.

Furthermore, the system of this invention can be implemented by a simple circuit. It is also an object of the present invention to provide a bus arbitration architecture that does not delay the time of bus arbitration as the number of bus masters increases. Another object is to provide a bus arbitration mechanism that guarantees to give bus access to each bus master within a specified time period.

Yet another object is to provide a bus arbitration mechanism capable of setting up priority order for bus masters according to the volume and important degree of the data processed by each bus master. In addition, the system according to the present invention can have two modes of priority order for bus masters. One is fixed and the other is programmable. In a programmable mode, system users can change the priority order to optimize the bus utilization dynamically according to the situation of transactions.

Furthermore, the bus arbitrator according to the present invention arbitrates the access of a common bus by a bus cycle unit. The bus arbitrator grants bus cycles to a bus master one by one. In addition, the bus arbitrator always determines which bus master may use the next bus cycle at the end of the current bus cycle. It means that the bus bandwidth is never wasted only for doing arbitration. Therefore, the bus utilization is always very efficient.

The foregoing and other objects, features, aspects and advantages of the present invention will become more apparent from a careful reading of a detailed description provided herein below, with appropriate reference to the accompanying drawings.

BRIEF DESCRIPTION OF THE DRAWINGS

FIG. 15 illustrates an example of an arrangement of the priority order information for the first bus arbitrator of FIG. 14.

FIG. 16 illustrates an example of assignment of the priority order information to each bus master for FIG. 15.

FIG. 22 illustrates an example of an arrangement of the priority order information for the second bus arbitrator of FIG. 19.

DETAILED DESCRIPTION OF THE PREFERRED EMBODIMENTS

The following description illustrates the architecture of the overall high-speed processor system having a bus arbitration mechanism according to the present invention. In addition, the essential features of the invention are described. Then several preferred embodiments of the invention are explained with reference to the drawings. It should be noted that a key feature of the present invention is that the high-speed processor system is constructed on a single semiconductor chip. This applies to any of the systems mentioned later.

Figure 1:
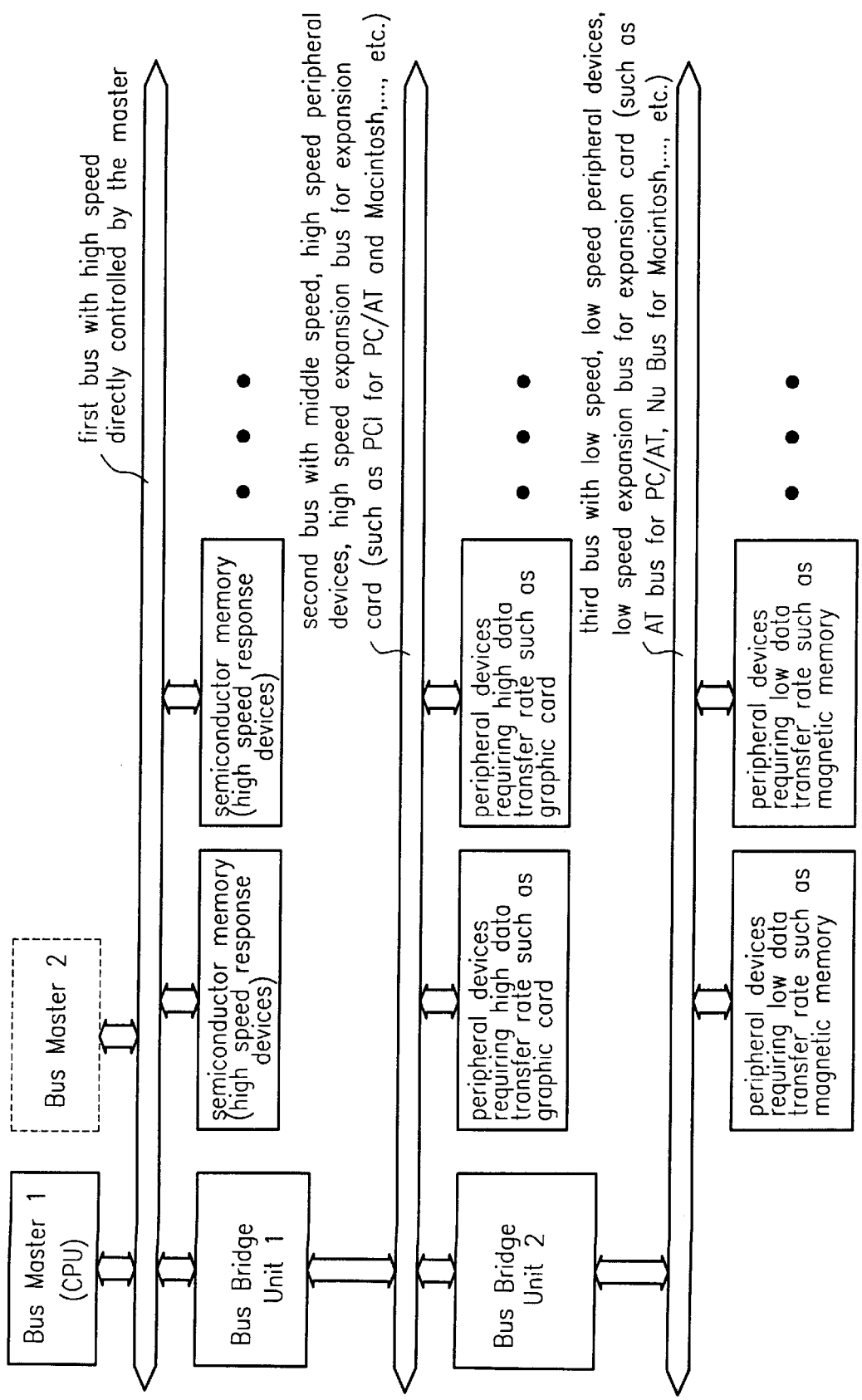
FIG. 1 illustrates a schematic diagram of a conventional layered bus system used in a personal computer.
Figure 2:
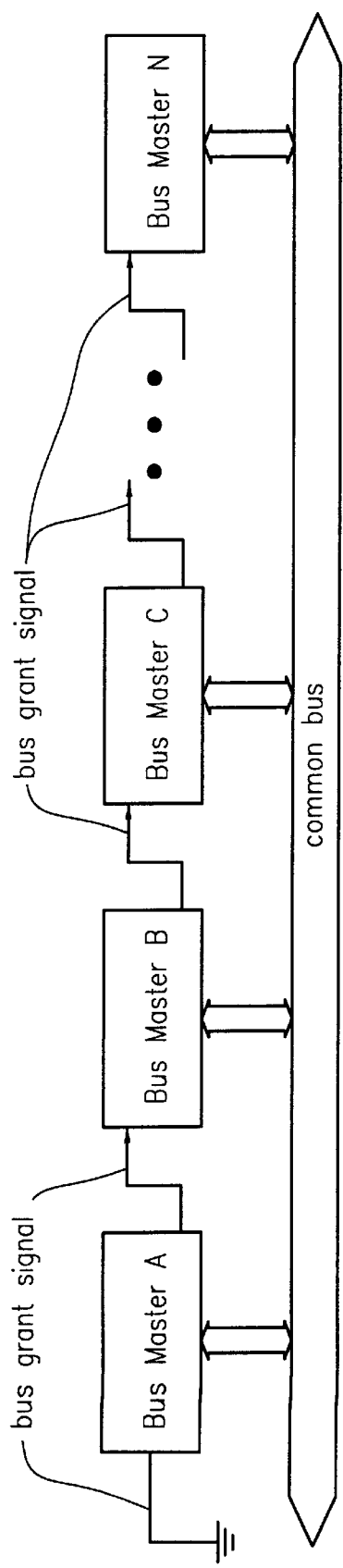
FIG. 2 illustrates a schematic diagram of a conventional bus arbitration system implemented by Daisy Chain method.
Figure 3:
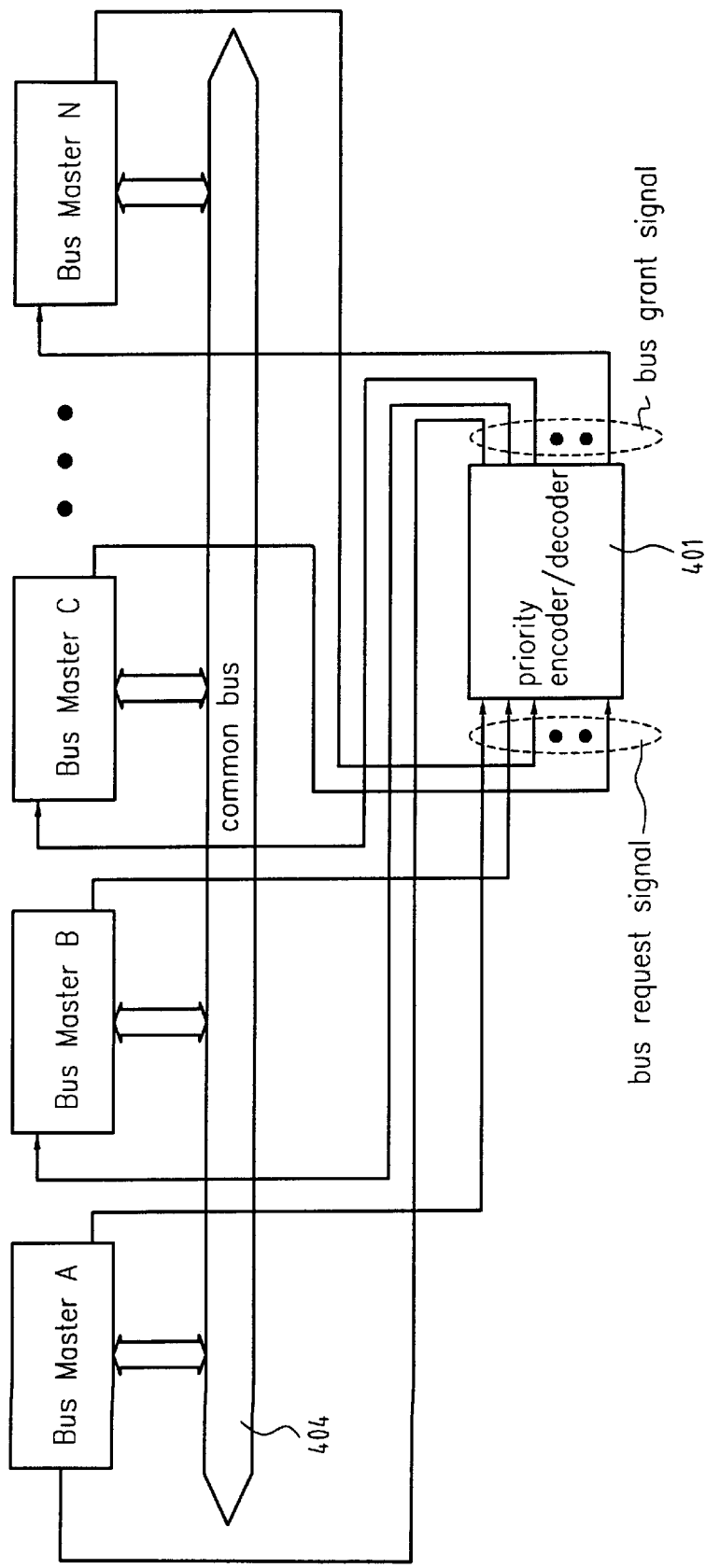
FIG. 3 illustrates a schematic diagram of a conventional bus arbitration system implemented by Concurrent method having a priority encoder/decoder.
Figure 4:
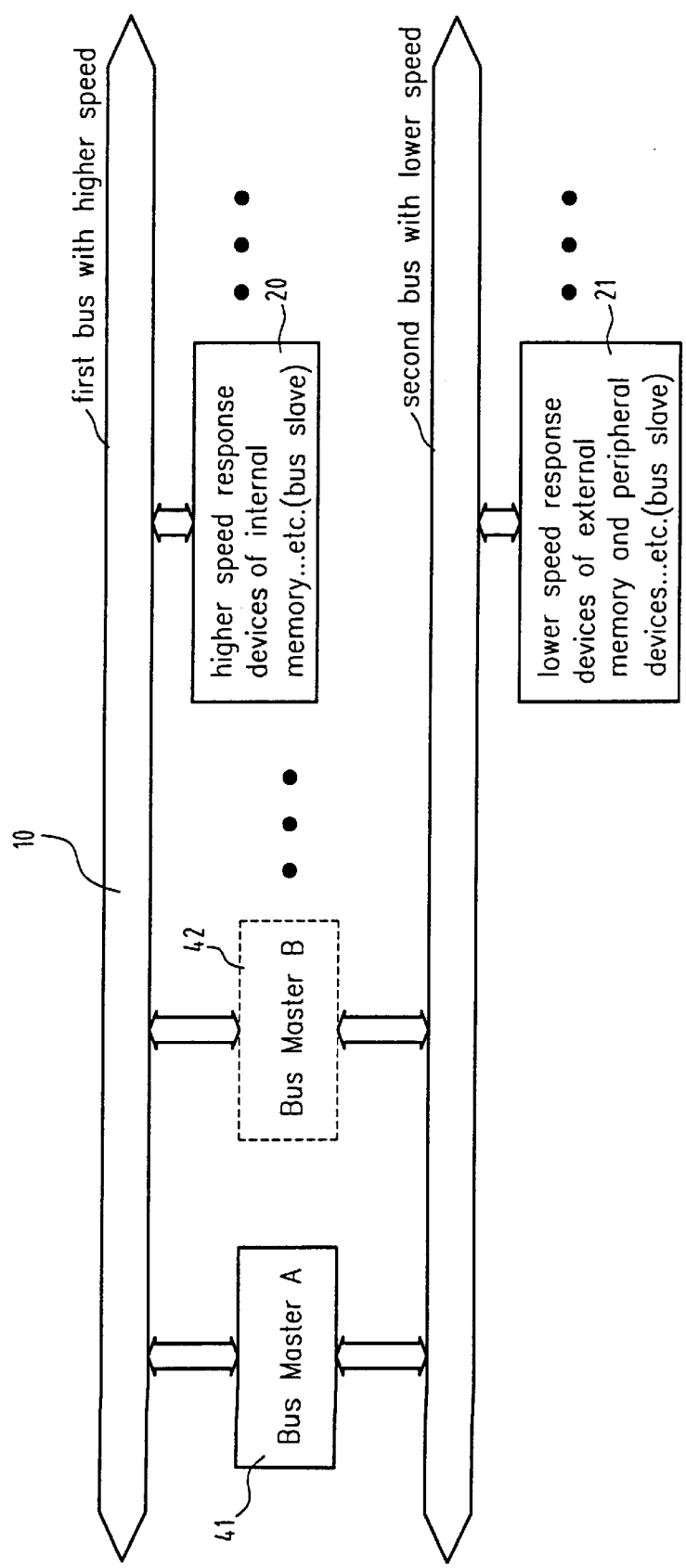
FIG. 4 illustrates a schematic diagram of the overall high-speed processor system according to the present invention.

As shown in FIG. 4, the high-speed processor system according to the present invention comprises a plurality of buses 10, 11, . . . and so on. Each bus has an independent address bus and an independent data bus for achieving the data transfer capability designed for the bus. There is at least one bus master 41, 42 as shown in FIG. 4. Each bus master is directly connected to all buses by means of a plurality of independent bus interfaces. Because of the direct connection between a bus master and all the buses, the bus bridge unit commonly used in the layered bus system as shown in FIG. 1 is no longer needed. The system can therefore be constructed by a relatively simple and small circuit. The high-speed processor system also comprises a plurality of bus slaves 20, 21, . . . and so on. Each bus slave is connected to a bus that has data transfer capability corresponds to that of the bus slave.

Another feature of the present invention is that the independent physical address space of each bus can be mapped onto a specified portion of a single logical address space of a bus master. In particular, the bus master further comprises a logical address generator, an address decoder and an address adjuster. The logical address generator issues a logical address. The address decoder decodes the issued logical address and determines which physical address space the issued logical address corresponds to. The issued logical address is translated into the physical address of the corresponding bus by the address adjuster.

In order to accomplish efficient bus utilization, the system according to the present invention may employ a bus cycle control mechanism. If the physical address space of a common bus is separated into plural portions and each portion has different bus cycle speed, bus slaves having different speed can be located at different address portions. It prevents the common bus from wasting time.

Accordingly, the high-speed processor system further comprises a bus cycle length controller for controlling the bus cycle length according to which address space portion the bus access corresponds to. The bus cycle length controller comprises a plurality of bus cycle length information storage devices, a bus cycle length information selector and a bus cycle end detector. The bus cycle length information is stored in the bus cycle information storage device and the bus cycle length information selector selects certain bus cycle length information based on which address space portion is accessed. The bus cycle end selector detects a bus cycle end according to the bus cycle length information selected by the bus cycle length information selector.

Another feature of the present invention is that the system provides a common bus for handling data transfer and exchange between bus masters and higher speed bus slaves, and another common bus for handling data transfer and exchange between bus masters and lower speed bus slaves.

The high-speed processor system of this invention may comprise a central processing unit (CPU) as one of the bus masters, and the bus slaves may include at least one sound controller for processing sound transactions and generating audio signals. In addition, the system may further comprise at least one picture controller as one of bus slaves for processing graphics transactions and generating video signals.

We now refer to another key feature of the present invention regarding the bus arbitration mechanism in a high-speed processor system having plural bus masters. According to the invention, the system comprises a plurality of independent bus arbitrators for arbitrating the access of each common bus by the bus masters. Furthermore, when a bus master is accessing one common bus, it releases other common buses so that other bus masters can access them.

Accordingly, each bus interface included in the bus master may further comprises tri-state buffers for controlling whether to output an address to the common address bus or not, bi-directional tri-state buffers for controlling whether to connect data to the common data bus or not, and a control means for controlling the tri-state buffers and the bi-directional tri-state buffers according to the bus grant signal sent by the bus arbitrator.

In addition, each independent bus arbitrator determines which bus master may use the next bus cycle at the end of the current bus cycle. Then it asserts a bus grant signal to the bus master that is allowed to use the bus cycle. Therefore, the bus can be accessed by a bus master anytime and avoid using a bus cycle only for arbitration.

Accordingly, the arbitration procedure of the bus arbitration mechanism comprises the following steps:

a. Each bus master issues a bus request signal which is in synchronization with a clock cycle.

b. The bus arbitrator determines which bus master may use the next bus cycle at the end of the current bus cycle.

c. The bus arbitrator asserts a bus grant signal to the bus master allowed to use the next bus cycle.

As a special feature of the bus arbitration mechanism of the present invention, the bus arbitrator has a plurality of priority order information storage devices each storing a set of priority order information for all the bus masters. One set of priority order information is selected continuously and cyclically every bus cycle. When more than one bus masters request the bus access at the same time, the bus arbitrator determines which bus master may access the bus according to the selected priority order information.

Accordingly, each bus arbitrator may further comprise a plurality of priority order information storage devices, a priority order information selector and a bus grant generator. The priority order information storage device stores a set of priority order information. Each set of priority order information determines access priority order for all the bus masters. The priority order information selector cyclically selects one set of priority order information from the priority order information storage devices every bus cycle. The bus grant generator issues a bus grant signal to the highest priority bus master among all the bus masters having issued a bus request according to the priority order information selected by the priority order information selector. Thus, the highest priority bus master has an access to the requested bus for one bus cycle.

Figure 5:
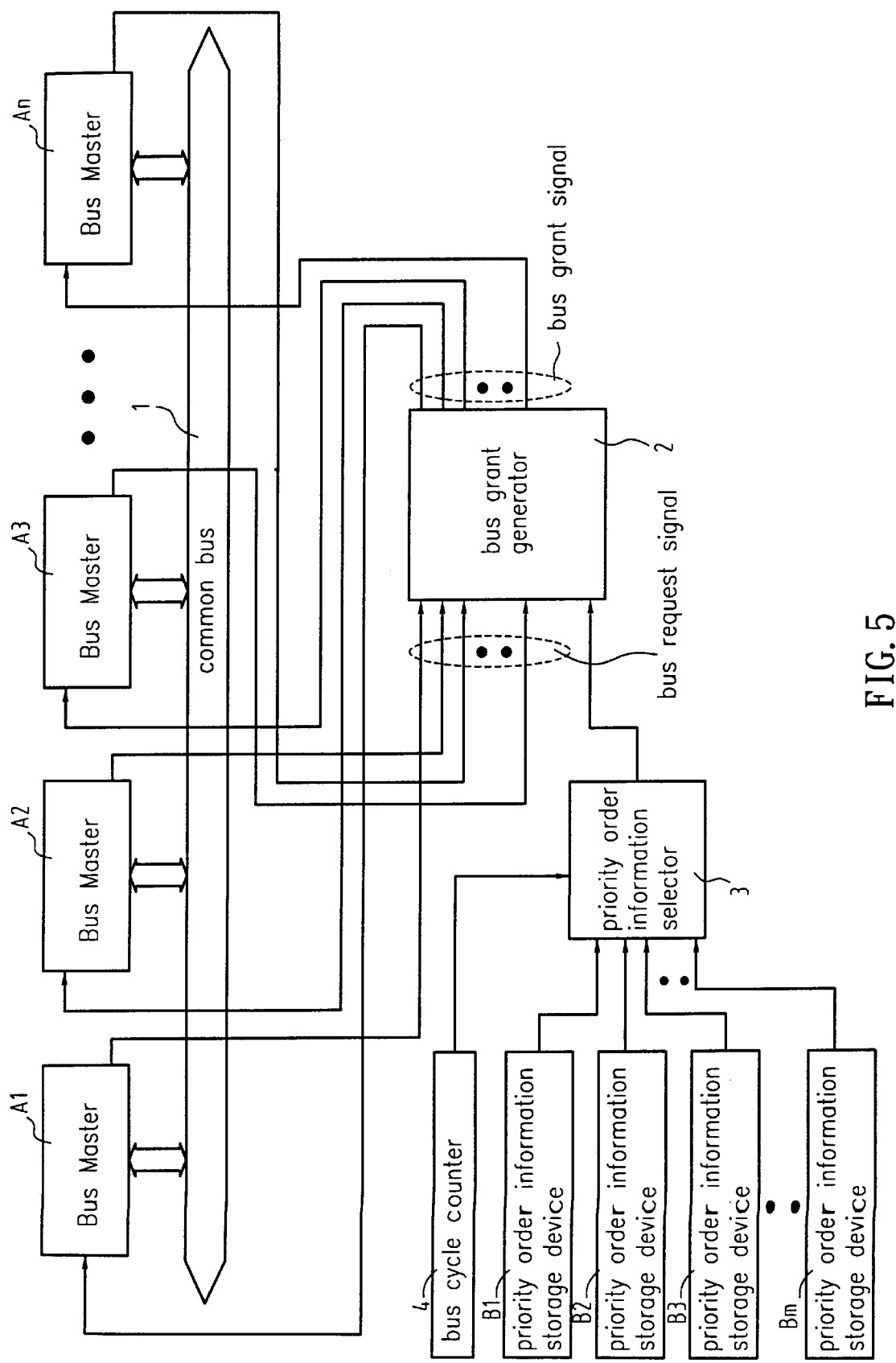
FIG. 5 illustrates a schematic diagram of an embodiment of the bus arbitration system according to the present invention.

FIG. 5 illustrates a schematic diagram of the bus arbitration mechanism for the high-speed processor system according to the present invention. As shown in the figure, the bus masters A1, A2, A3, . . . , An are connected to the common bus 1. Each bus master may issue a bus request signal to the bus grant generator 2. The bus grant generator 2 can assert a bus grant signal to any of the bus masters. In addition, the priority order information storage devices B1, B2, B3, . . . , Bm are connected to the priority order information selector 3. The bus cycle counter 4 provides a count value to the priority order information selector 3, and the priority order information selector 3 selects one set of priority order information according to the count value and sends it to the bus grant generator 2.

The arbitration method proceeds as follows. Any one of the priority order information storage devices B1, B2, B3, . . . , Bm stores a set of priority order information for the bus masters respectively. The priority order information selector cyclically selects a set of priority order information from the priority order information storage devices every bus cycle and then a bus access is granted to the highest priority bus master (one of A1, A2, A3, . . . , An) according to the selected priority order information. If the first priority bus master has no request to access the bus, the second priority bus master can be granted. But if the second priority bus master has no request to access the bus either, the third priority bus master can be granted, and so on. After obtaining the bus grant signal, the bus master can access the bus for one bus cycle.

Figure 6:
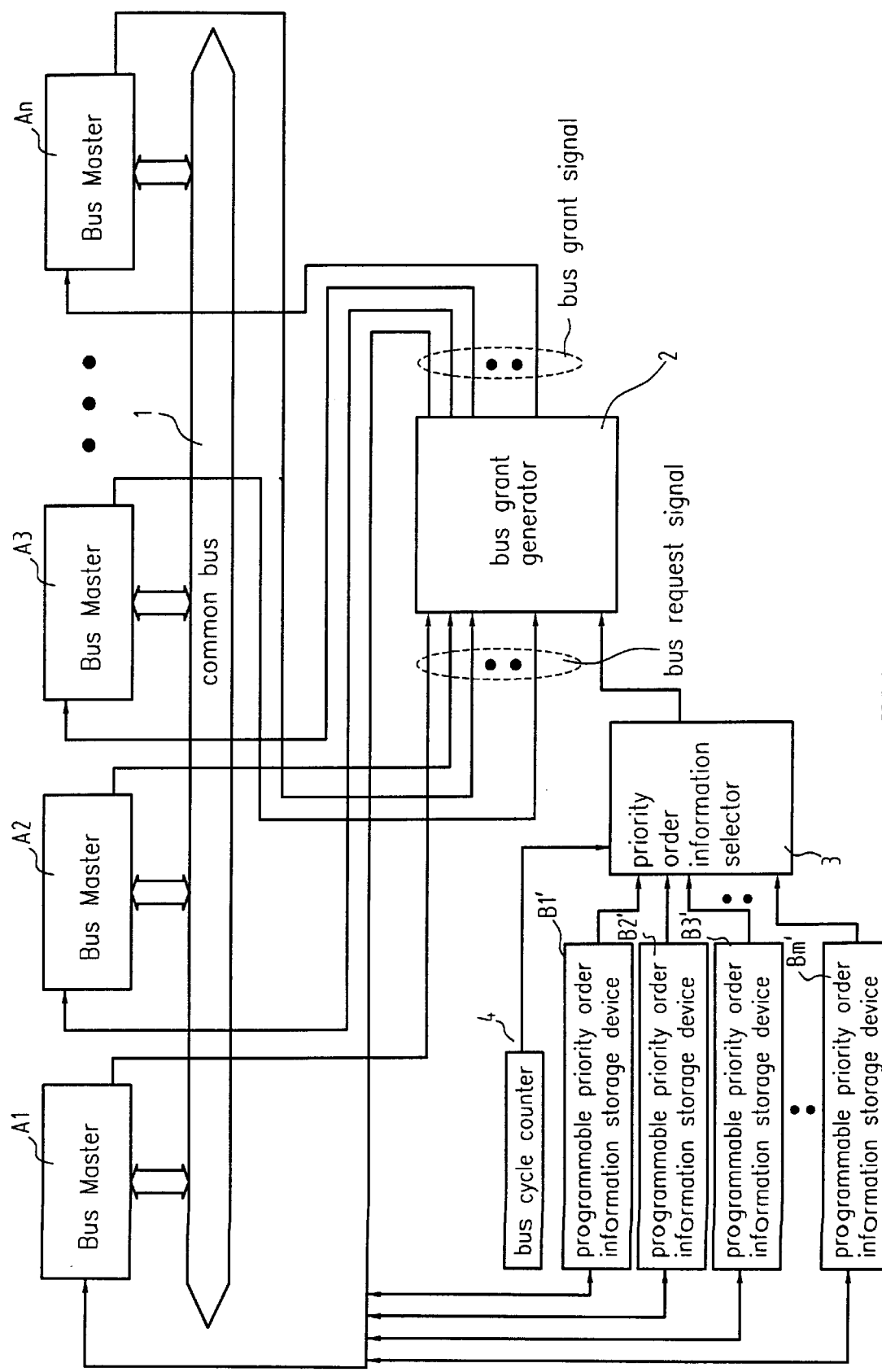
FIG. 6 illustrates a schematic diagram of another embodiment of the bus arbitration system according to the present invention, wherein the priority order information stored in the priority order information storage device is programmable.

In order to optimize the bus utilization dynamically, it is desirable that the priority order information be programmable. FIG. 6 illustrates a schematic diagram of the bus arbitration system according to the present invention, wherein the priority order information stored in the priority order information storage device is programmable.

Furthermore, the bus arbitration mechanism of this invention may have two modes of storing the priority order information in one system. One is fixed mode and the other is programmable mode. A fixed/programmable switching means selects which mode to use. Accordingly, the bus arbitrator may comprise a plurality of fixed priority order information storage devices each storing a set of fixed priority order information for the all bus masters, a plurality of programmable priority order information storage devices each storing a set of programmable priority order information for all bus masters, and a fixed/programmable switching means for selecting either the fixed priority order information storage devices or the programmable priority order information storage devices.

Figure 7:
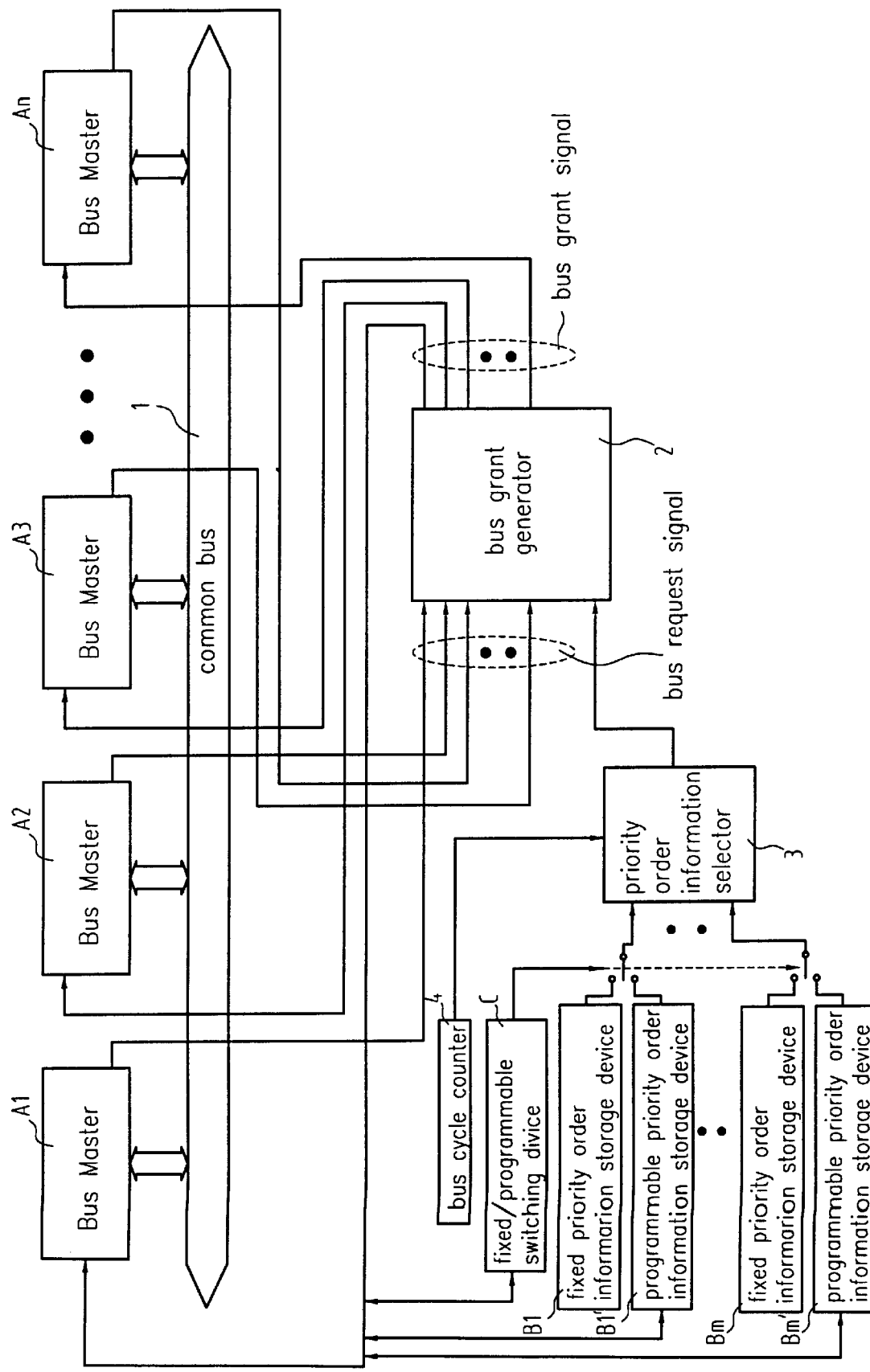
FIG. 7 illustrates a schematic diagram of an alternative embodiment of the bus arbitration system according to the present invention, wherein selectable fixed and programmable priority order information are stored in the priority order information storage devices.

FIG. 7 illustrates a schematic diagram of the bus arbitration mechanism for the high-speed processor system according to the present invention, wherein there are a plurality of fixed priority order information storage devices (B1, B2, . . . , Bm) and a plurality of programmable priority order information storage devices (B1', B2', . . . , Bm'). The number of fixed priority order information storage devices and the number of programmable priority order information storage devices are identical. They are switched in and out by the fixed/programmable switching means C.

As shown in FIG. 7, the programmable priority order information storage devices B1', B2', B3', . . . , Bm' and the fixed/programmable switch means C are connected to the common bus 1. Bus masters connected to the common bus 1 can access both the programmable priority order information storage devices and the fixed/programmable switching means. If a bus master has the capability to write data into the common bus, it can access those storage devices or switching means.

FIGS. 5, 6 and 7 illustrate only a single bus arbitration mechanism. The high-speed processor system of this invention, however, may have more than one bus, each having its own bus arbitrator and data transfer capability. As an example, the system may comprise a first bus for handling data transfer and exchange between bus masters and faster bus slaves and a second bus for handling data transfer and exchange between bus masters and slower bus slaves. Under this circumstance, a first arbitrator and a second arbitrator will be arbitrating the first and second buses respectively.

Embodiments

Figure 8:
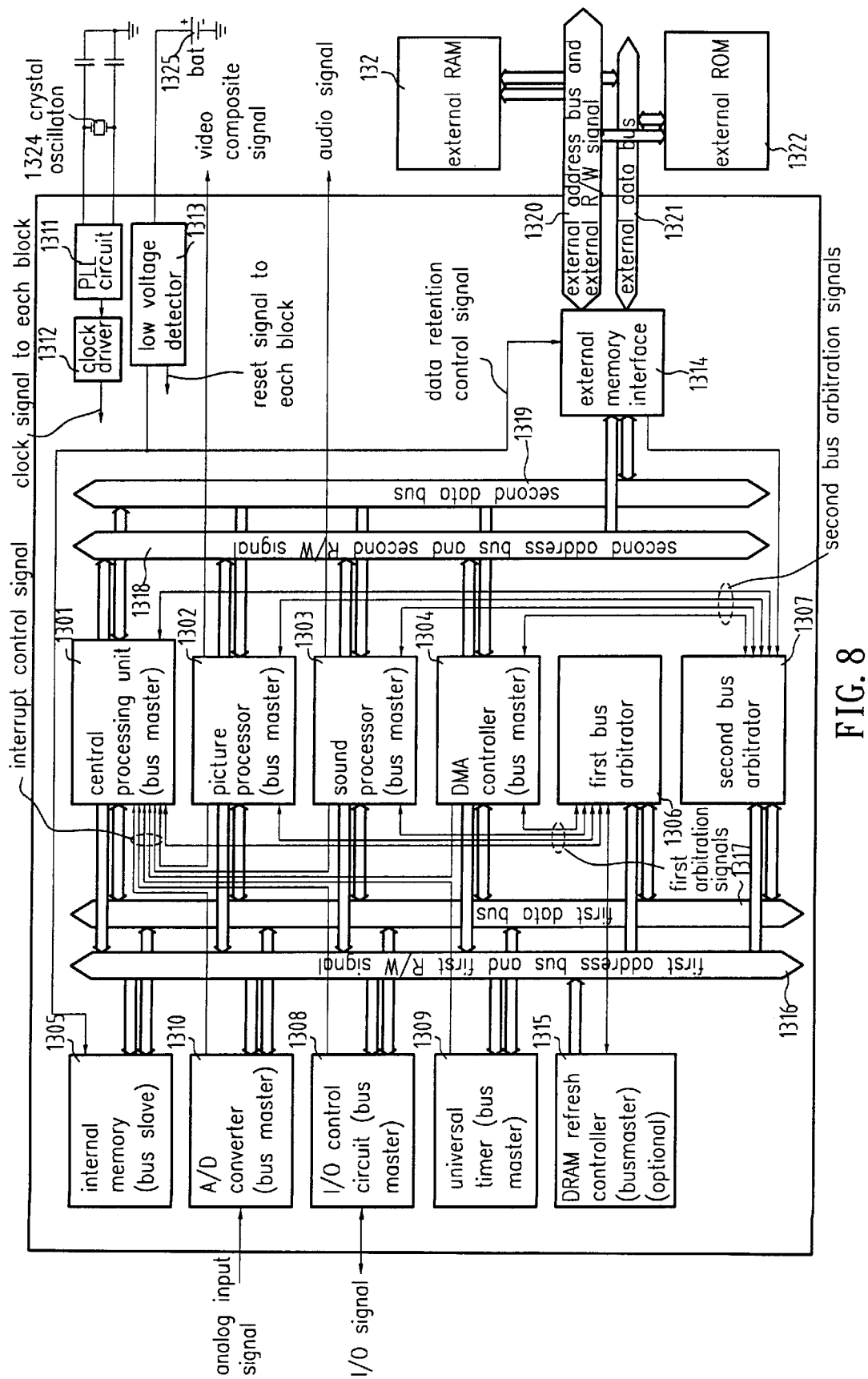
FIG. 8 illustrates an embodiment of the high-speed processor system having a bus arbitration mechanism according to the present invention.

FIG. 8 illustrates an embodiment of the overall high-speed processor system having bus arbitration mechanisms according to the present invention. In the embodiment, the processor system comprises first and second buses and a plurality of bus masters including a CPU 1301, a Picture Processor 1302, a Sound Processor 1303 and a DMA (Direct Memory Access) controller 1304, all connected to both buses. It also comprises a plurality of bus slaves including an internal memory 1305, an I/O control circuit 1308, a universal timer 1309, an A/D converter 1310 and an optional DRAM refresh controller 1315, all connected to the first bus. A first bus arbitrator 1306 and a second bus arbitrator 1307 provide the arbitration for first and second buses respectively. The processor system also include a PLL (Phase Locked Loop) circuit 1311, a clock driver 1312, a low voltage detector 1313 and an external memory interface 1314.

The first bus comprises a first address bus and a first R/W signal 1316 as well as a first data bus 1317. The second bus comprises a second address bus and a second R/W signal 1318 as well as a second data bus 1319. The second address bus and second R/W signal 1318 are connected to an external address bus and an external R/W signal 1320, and the second data bus 1319 is connected to an external data bus 1321 through the external memory interface 1314 respectively.

Both first and second buses have bus arbitration signals. The first bus arbitration signals in FIG. 8 comprise first bus request signals and first bus grant signals. The second bus arbitration signals in FIG. 8 comprise second bus request signals, second bus grant signals and a second bus cycle end signal.

As shown in FIG. 8, there are several external devices connected to the processor system. For the system to function properly, it has to include at least one external ROM (Read Only Memory) 1322 as a second bus slave, at least one external RAM (Random Access Memory) 1323 also as a second bus slave which can be optional, a Crystal Oscillator 1324 and an optional data retention circuit for SRAM (Static Random Access Memory).

The CPU 1301 is an 8-bit microprocessor. It executes instructions and controls the system according to the software stored in the memory. There are a 24-bit address bus and an 8-bit data bus for the CPU.

The Picture Processor 1302 processes graphic transactions and generates a video composite signal for a video display. A video display screen is composed of two dimensional pixels. Graphics has two kinds of elements. One is Text Screen and the other is Sprite. Hereafter, A Character is referred to as a set of pixels. Text Screen consists of two dimensional sets of Characters, and it has enough size to cover the whole video display screen. A Sprite consists of one Character, and it is re-locatable on the video display screen. In this embodiment, the number of available Text Screens is two and there are 256 pieces of Sprites. And the Picture Processor can generate video composite signals for NTSC and PAL standard display for a video display.

The Sound Processor 1303 processes sound transactions and generates an audio signal 1323'. The audio signal is composed of PCM (Pulse Code Modulation) data stream through pitch transformation and amplitude modulation. The amplitude modulation has two kinds of functions. One is a volume control function controlled by the CPU 1301. And the other is an envelope control function for reproducing music instrument wave form such as piano, drum and so on.

The DMA controller 1304 handles data transfer from the external ROM 1322 or RAM 1323 to the internal memory 1305. The internal memory 1305 comprises Mask ROM, SRAM or DRAM according to the requirement. If data retention of the SRAM is necessary, a Battery 1325 is required as an external device of the high-speed processor. If DRAM is included, it is necessary to periodically refresh the memory in order to maintain the content in DRAM.

The first bus arbitrator 1306 arbitrates the access of the first bus. It receives first bus request signals from bus masters connected to the first bus and determines one bus master that is allowed to have the bus access for the next bus cycle according to the first bus priority order information. It asserts the bus grant signal of the bus master that is granted access to the bus. In this embodiment, the arbitration procedure is accomplished in one bus cycle that is equal to one clock cycle.

The second bus arbitrator 1307 arbitrates the access of the second bus. It receives second bus request signals from bus masters connected to the second bus and determines one bus master that is allowed to have the bus access for the next bus cycle according to the second bus priority order information. The bus grant signal to the allowed bus master is asserted. In this embodiment, the arbitration procedure is also accomplished one cycle. However, one cycle is equal to 2–8 clock cycles in the second bus.

The I/O control circuit 1308 handles communication between the high-speed processor and external devices. The universal timer 1309 controls one of interrupt request signals to the CPU 1301 according to the time interval set by the application software. The A/D converter 1310 converts an analog voltage input signal into a digital signal.

The PLL circuit 1311 is constructed from a Phase Locked Loop. It generates a high frequency clock signal whose frequency is M/N times (M and N are integers) that of an input signal sent from the crystal oscillator 1324. The clock driver 1312 enhances the intensity of the clock signal generated by the PLL circuit 1311 for distributing the clock signal to each function block.

The low voltage detector 1313 monitors the power voltage of the system. When the system power voltage is less than a pre-defined voltage, it asserts a detection signal to reset the PLL circuit 1311 and the whole system. In addition, the low voltage detector triggers the battery back-up control signal in order to retain contents of the SRAM when the system power is less than the defined voltage.

The external memory interface 1314 comprises interface circuits for connecting the second bus to the external bus, a bus cycle length controller for the second bus, and a memory mapping mode control register. There are two memory mapping modes that can be selected by the memory mapping mode control register. The selected memory mapping mode is applied to all bus masters. In each mode, the external bus address space is divided into area A and area B. Bus cycle lengths (2 to 8 clock cycles) of these two areas can be set independently according to the physical memory's access speed.

The DRAM refresh controller 1315 requests the first bus access periodically. It is a privileged bus master. When this refresh controller requests, the first bus arbitrator holds for 1 cycle to allow it to use the first bus for controlling the DRAM refreshing execution.

As mentioned before, the first bus comprises the 16-bit first address bus, the first R/W signal and the 8-bit first data bus. It handles data transfer and exchange among function blocks and high-speed semiconductor memories inside the high-speed processor. The second bus comprises the 24-bit second address bus, the second R/W signal and the 8-bit second data bus. It handles data transfer and exchange among peripheral units and low speed semiconductor memories outside the high-speed processor.

In the high-speed processor system, the Picture Processor 1302, the Sound Processor 1303, the DMA controller 1304, the I/O control circuit 1308, the universal timer 1309, and the A/D converter 1310 are capable of issuing interrupt request signals to the CPU.

Figure 9:
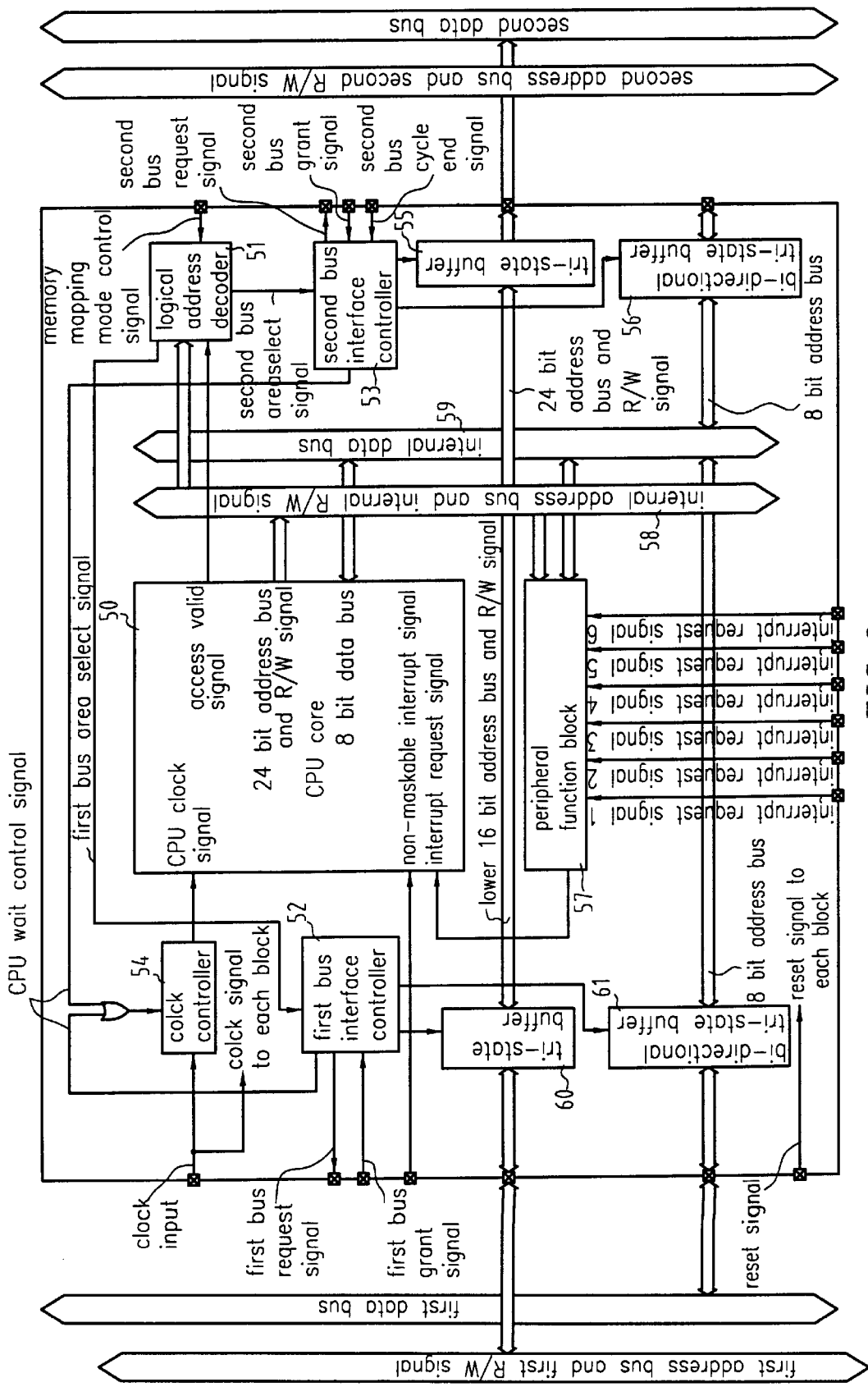
FIG. 9 illustrates the block diagram of a central processing unit according to the present invention.

FIG. 9 illustrates the block diagram of the CPU according to the present invention. This CPU is one of the bus masters constituting the high-speed processor system according to the present invention. The CPU is capable of issuing independent bus request signals for the first or second bus and then waits for accessing the bus until it receives a bus grant signal.

As shown in FIG. 9, the CPU comprises a CPU core 50, an address decoder 51, a first bus interface controller 52, a second bus interface controller 53 and a clock controller 54. It also has two sets of tri-state buffers 55, 60, two sets of bi-directional tri-state buffers 56, 61, a peripheral function block 57, an internal address bus and an internal R/W signal 58 and an internal data bus 59.

The CPU core 50 executes each instruction and controls the system according to the software stored in the memory. And its execution is synchronized with the CPU clock signal received from the clock controller 54. In addition, the CPU core handles the 24-bit internal address bus and the internal R/W signal 58 as well as the 8-bit internal data bus 59 as bus interface signals. It also outputs an access valid signal synchronized with its own bus cycle. During internal cycles of CPU, the access valid signal is inactive. This signal informs to the external function blocks that the bus interface signal of the CPU is invalid.

Only the internal address bus and the internal R/W signal 58, and the internal data bus 59 are connected to the CPU core 50 directly. The first bus and the second bus are not connected to the CPU core 50. Hereafter, the address space of the internal bus is treated as the logical address space of the CPU.

Peripheral function block 57 comprises a multiplier, a barrel shifter, internal vector registers and a status register of interrupt request signals. And it further comprises a logical OR function whose input signals are 6 interrupt request signals. An output signal from the logical OR function is sent to CPU core 50 as a unified interrupt request signal.

The address decoder 51 decodes the logical address signals. The logical address space comprises the first bus space, the second bus space and the peripheral function block space. According to the decoded logical address information, the access valid signal and the memory mapping mode control signal sent from the external memory interface (not shown in FIG. 9), the address decoder 51 determines which address space the CPU core is trying to access. If the first bus area is accessed, the address decoder 51 issues the first bus area select signal that is sent to the first bus interface controller 52. If the second bus area is accessed, the address decoder issues the second bus area select signal that is sent to the second bus interface controller 53. If the peripheral function block space is accessed or the access valid signal is invalid, the CPU does not have a bus access to either the first bus or the second bus.

The first bus interface controller 52 generates a first bus request signal sent to the first bus arbitrator according to the first bus area select signal from the address decoder 51. The first bus interface controller asserts the first bus request signal until it receives the first bus grant signal from the first bus arbitrator. The first bus arbitrator asserts the first bus grant signal for only one clock cycle. During the one clock cycle, the first bus interface controller asserts a control signal to enable the tri-state buffers 60 and the bi-directional tri-state buffers 61.

The second bus interface controller 53 generates a second bus request signal sent to the second bus arbitrator according to the second bus area select signal from the address decoder 51. The second bus interface controller asserts the second bus request signal until it receives the second bus grant signal from the second bus arbitrator. The CPU is allowed to access the second bus from the time it receives the second bus grant signal until it receives the second bus cycle end signal. During this period, the second bus interface controller asserts a control signal to enable the tri-state buffers 55 and the bi-directional tri-state buffers 56.

The clock controller 54 controls to send or stop a clock signal to the CPU core 50 according to the processor wait control signal from the first bus interface controller 52 or the second bus interface controller 53.

The tri-state buffers 60 control whether to output the lower 16 bits of the internal address and the internal R/W signal 58 to the first address bus and the first R/W signal or not according to the control signal from the first bus interface controller 52. In other words, the tri-state buffers 60 control whether to output the 17-bit signals or not.

The tri-state buffers 55 control whether to output the 24-bit internal address and the internal R/W signal 58 to the second address bus and the second R/W signal or not according to the control signal from the second bus interface controller 53. In other words, the tri-state buffers 55 control whether to output the 25-bit signals or not.

The bi-directional tri-state buffers 61 control whether to connect the internal data bus 59 with the first data bus or not according to the control signal from the first bus interface controller 52. In other words, the bi-directional tri-state buffers 61 control whether to connect the 8-bit signals or not.

The bi-directional tri-state buffers 56 control whether to connect the internal data bus 59 with the second data bus or not according to the control signal from the second bus interface controller 53. In other words, the bi-directional tri-state buffers 56 control whether to connect the 8-bit signals or not. The address space of the CPU is discussed as follows. The CPU core 50 has 24-bit address signals. Thus, the size of the address space is 16M bytes. It is referred to as a logical address space in the software executed by the CPU core 50. The first bus has 16-bit address signals. The size of the corresponding address space is 64K bytes. The second bus has 24-bit address signals. Thus, the size of the corresponding address space is 16M bytes. The address space of the second bus is divided into two areas. One is referred to as second bus area A and the other is referred to as second bus area B. Each bus area can have independent bus cycle length.

In this embodiment, the first bus physical address space and the second bus physical address space are assigned in the logical address space of the CPU core 50. CPU core 50 selects one of the physical address spaces for every access. A physical address space, which is not selected by the CPU core 50, is available for other bus masters.

Figure 10:
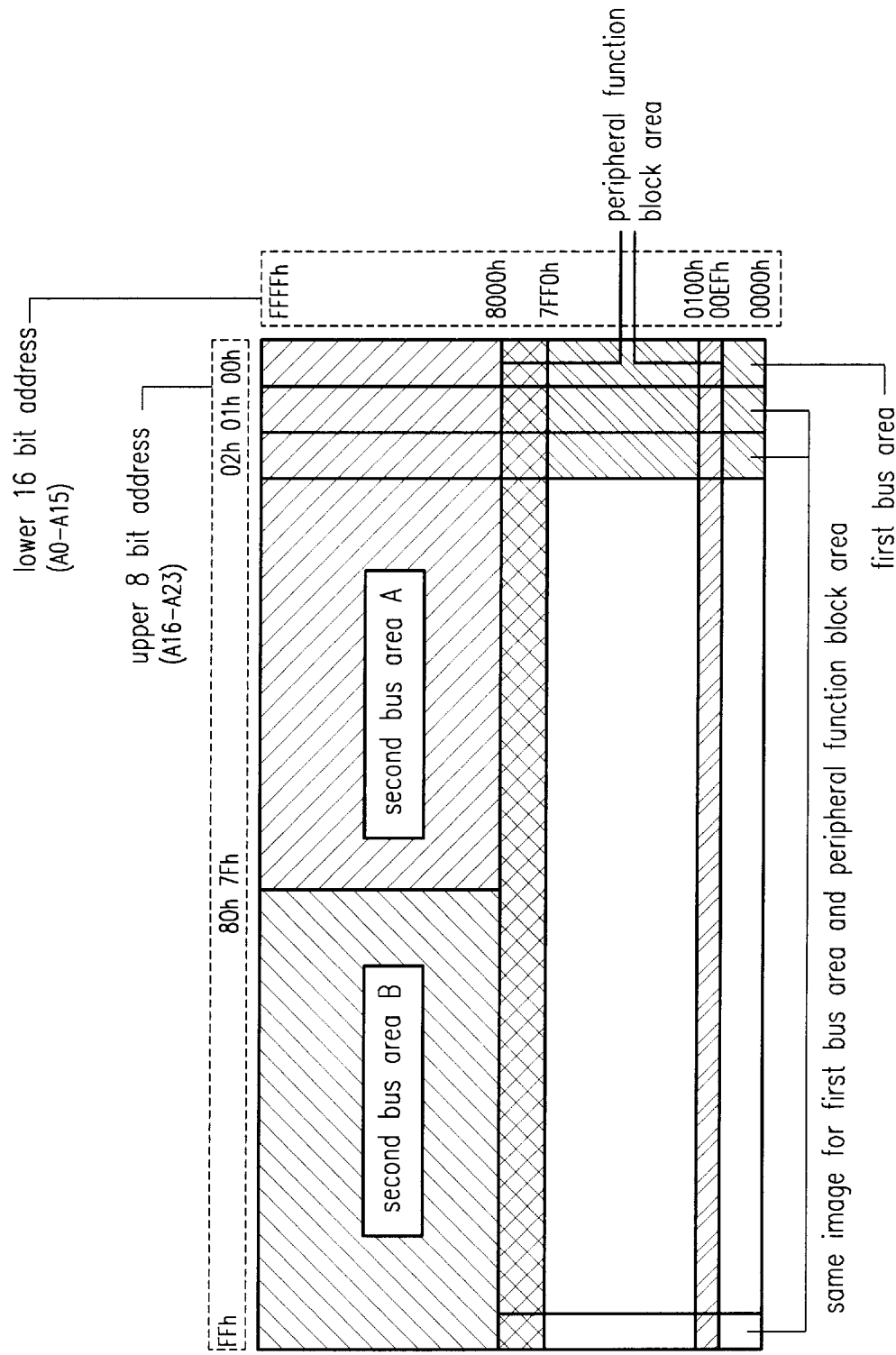
FIG. 10 illustrates the memory mapping mode 1 of the logical address space for the central processing unit according to the present invention.
Figure 11:
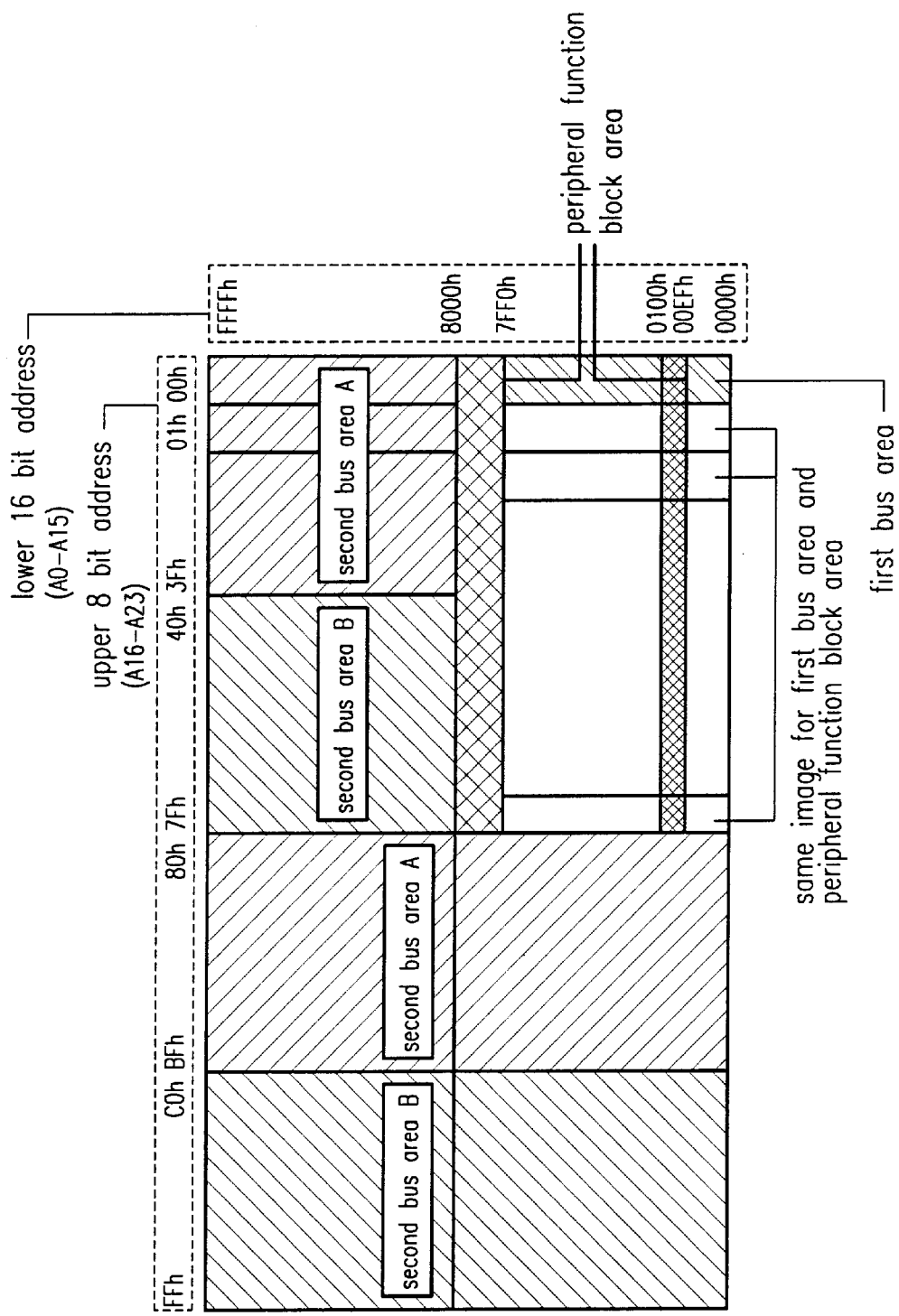
FIG. 11 illustrates the memory mapping mode 2 of the logical address space for the central processing unit according to the present invention.

For the CPU, there are two memory mapping modes as shown in the FIG. 10 and FIG. 11 respectively. One is referred to as memory mapping mode 1. The other is referred to as memory mapping mode 2. These two modes can be switched by a memory mapping mode control register in the external memory interface.

The memory mapping mode control register (not shown in the figures) is connected to the first bus, and bus masters connected to the first bus can access this control register. The selected memory mapping mode is applied to all bus masters.

The CPU core 50 issues a 24-bit address that is divided into a lower 16-bit address and an upper 8-bit address. The upper 8-bit address space is referred to as the bank address. Therefore, the 16M bytes logical space is divided into 256 banks with banks 00H to FFH (H represents hexadecimal, hereafter). Each bank has a size of 64K bytes. It should be noted that the address FFFFH of bank 00H is not adjacent to the address 0000H of bank 01H. For best illustration, banks 00H–FFH are laid in parallel as shown in FIG. 10 and FIG. 11.

The two memory mapping modes 1 and 2 are now described in detail. FIG. 10 illustrates the memory map for memory mapping mode 1. In the design of FIG. 10, the address space of the peripheral function block 57 corresponds to the logical address space 00FEH, 00FFH and 7FF0H–7FFFH of every bank (00H–FFH).

In the following description, the logical address may be shown as ABH:CDEFH, where ABH is the bank address and CDEFH is the memory address in the memory bank. A logical address 00H–FFH:8000H–FFFFH represents the addresses 8000–FFFFH of bank 00H to bank FFH.

The 64K physical address space 0000H–7FEFH of the first bus physical address space (except 00FEH and 00FFH) corresponds to the memory address 0000H–7FEFH (except 00FEH and 00FFH) of every bank (00H–FFH) of the logical address space of the CPU core. The CPU core cannot access the physical address space 7FF0H–FFFFH of the first bus.

As mentioned above, both the peripheral function block and the physical address space of the first bus are assigned to every bank in the logical address space. In other words, either logical address 00H:0000H or 01H:0000H corresponds to the same physical address 0000H of the first bus.

The CPU core can only access the physical address space of the second bus represented by XX8000H–XXFFFFH, where XX represents any two digit hexadecimal number from 00H–FFH. Each accessible physical address ABCDEFH corresponds to the logical address space ABH:CDEFH. The second bus area A is referred to as the logical address space 00H–7FH:8000H–FFFFH and the second bus area B is referred to as the logical address space 80H–FFH:8000H–FFFFH.

FIG. 11 illustrates the memory map for memory mapping mode 2. In the design of FIG. 11, the address space of the peripheral function block 57 corresponds to the logical address space 00FEH, 00FFH and 7FF0H–7FFFH of every bank from 00H to bank 7FH.

The 64K physical address space 0000H–7FEFH of the first bus physical address space (except 00FEH and 00FFH) corresponds to the memory address 0000H–7FEFH (except 00FEH and 00FFH) of every bank from bank 00H to bank 7FH of the logical address space of the CPU core. The CPU core cannot access the physical address space 7FF0H–FFFFH of the first bus.

The second bus physical address space from 008000H–00FFFFH to 7F8000H–7FFFFFH corresponds to the logical address space 00H–7FH:8000H–FFFFH. And the second bus physical address space 800000H–FFFFFFH corresponds to the logical address space 80H–FFH:0000H–FFFFH. The second bus area A is referred to as the logical address space 00H–3FH:8000H–FFFFH and 80H–BFH:0000H–FFFFH, and the second bus area B is referred to as the logical address space 40H–7FH:8000H–FFFFH and C0H–FFH:0000H–FFFFH. The CPU core cannot access the second bus physical address space from 000000H–007FFFH to 3F0000H–3F7FFFH.

Thus, nearly 32K bytes of the first bus physical address space and 8M bytes (Mode 1) or 12M bytes (Mode 2) of the second bus physical address space are mapped into the logical address space. Therefore, the software executed by the CPU core can continuously handle both physical bus address space as a unified address space.

Furthermore, the CPU core does not occupy both the first bus and the second bus at the same time because only one of the peripheral function block, the first bus and the second bus is selected for every bus cycle. It means that while the CPU core has an access to one of them, other buses can be accessed by other bus masters.

Figure 12:
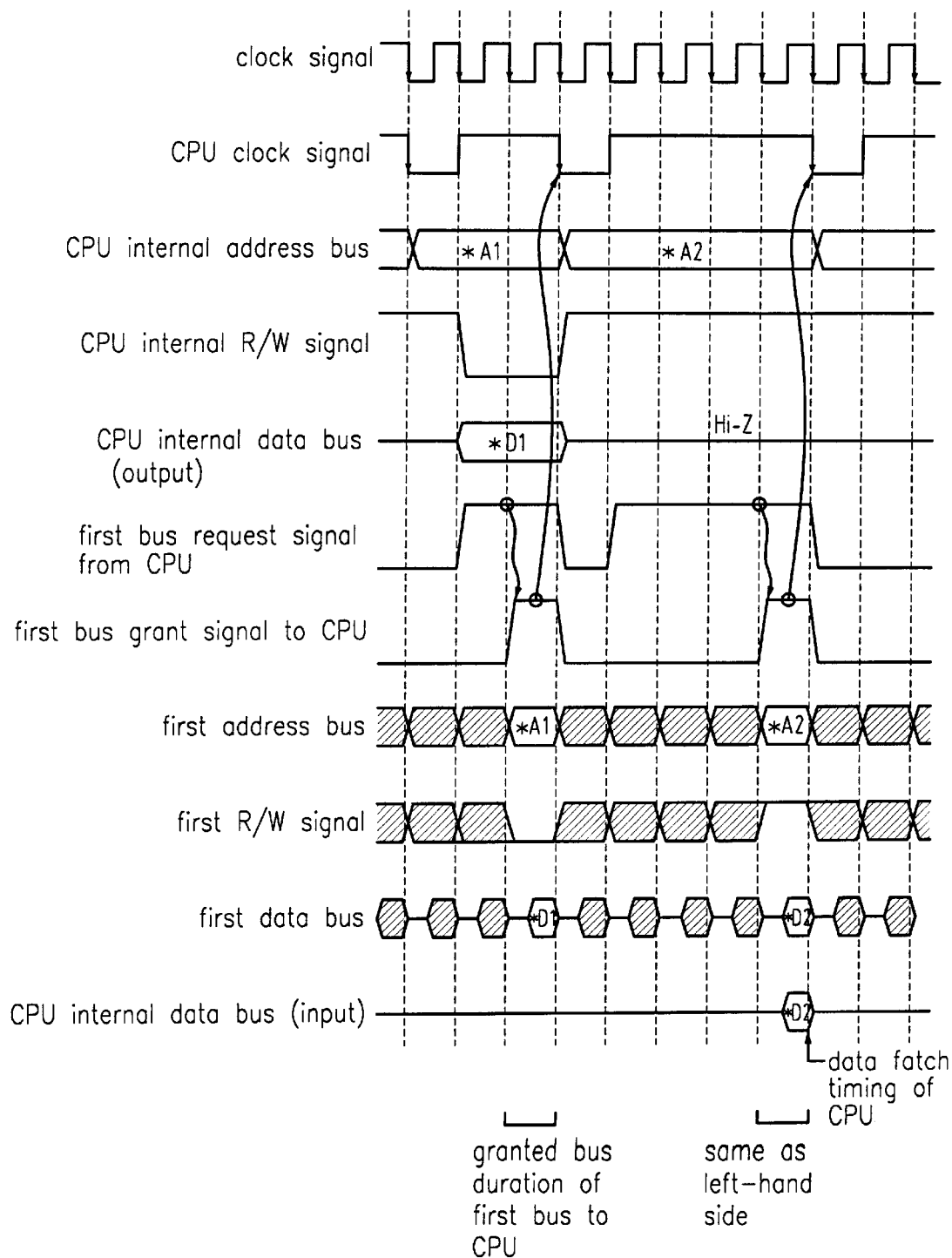
FIG. 12 illustrates an example of the timing chart of the first bus access procedure from the CPU shown in FIG. 9.
Figure 21:
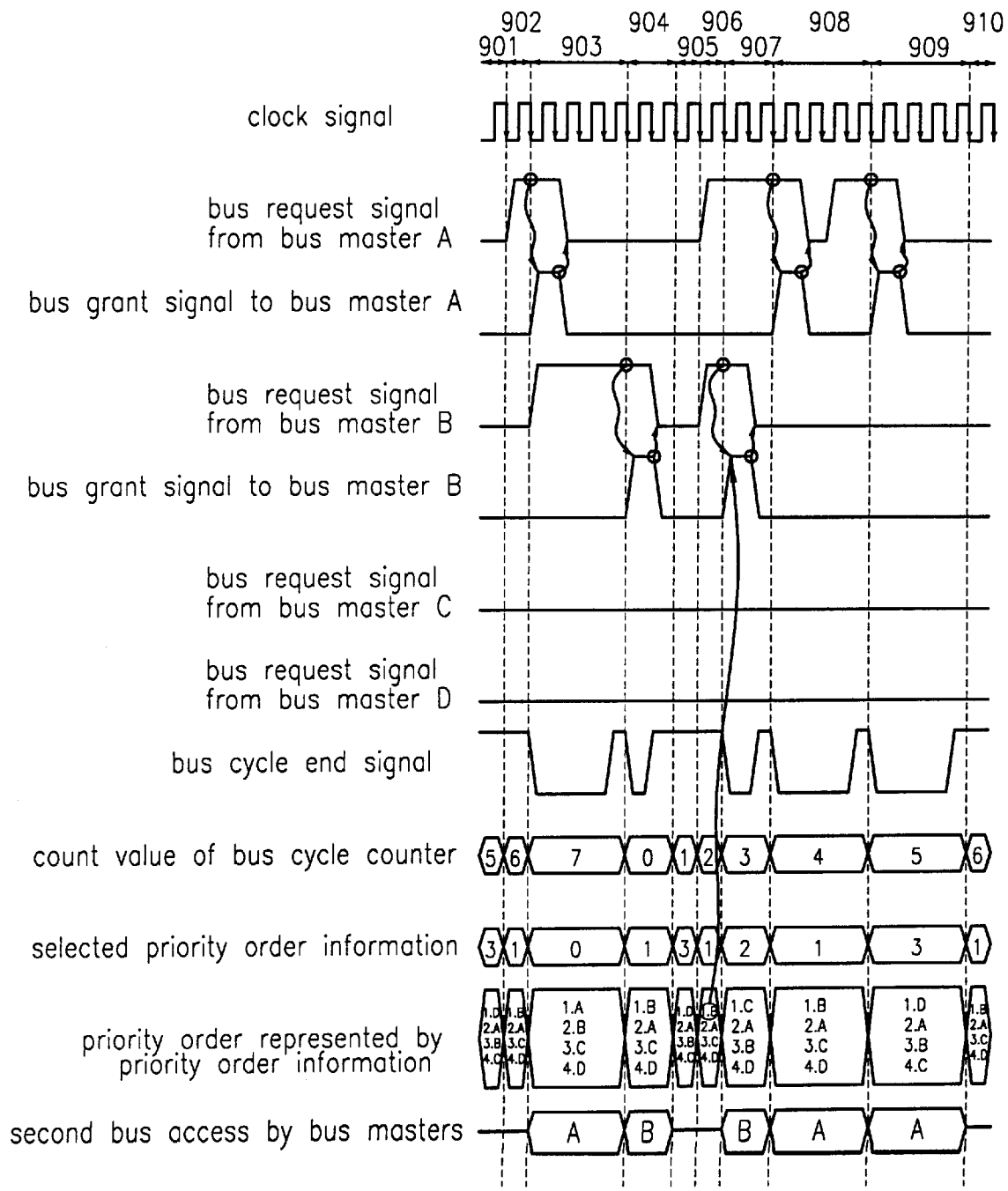
FIG. 21 illustrates an example of the timing chart of the bus arbitration procedure for the second bus arbitrator of FIG. 19.

FIG. 12 illustrates an examples of the timing charts of the first bus access procedure from the CPU in FIG. 9. In the example of FIG. 12, one bus cycle is equal to one clock cycle. In the CPU, a bus cycle for CPU core 50 takes at least 3 clock cycles. This is longer than a bus cycle of the first bus because the first bus arbitration procedure is accomplished in bus cycle that is one clock cycle. Therefore, the timing control shown in FIG. 21 is required to achieve the functionality for the first bus arbitration procedure.

The CPU core is synchronized with a CPU clock cycle. One bus cycle of the CPU core is also equal to CPU clock cycle. The CPU core issues a logical address being synchronized with a received CPU clock signal. The address decoder determines whether the bus to be accessed from the CPU core corresponds to the first bus address space or not according to the issued logical address, address valid signal and memory mapping mode information. If the bus corresponds to the first bus, then the first bus interface controller generates a first bus request signal to the first bus arbitrator according to the first bus area select signal from the address decoder.

The first bus arbitrator arbitrates the access of the first bus for each bus master having issued the first bus request signal. It determines which bus master may use the next bus cycle. The first bus arbitrator then asserts the first bus grant signal to the bus master that is allowed to use the bus cycle. The bus grant signal is asserted by the bus arbitrator for only one clock cycle. Each bus master can use the first bus only while it receives the first bus grant signal. No two bus masters may use the first bus at the same time.

The clock controller controls to send or stop a clock signal to the CPU core. While the CPU is waiting for the first bus grant signal, the clock controller suspends supplying the clock signal to hold the CPU behavior. When the CPU gets the first bus grant signal, the clock controller resumes supplying the clock signal and releases the CPU.

While the CPU is granted to access the first bus, the CPU outputs the internal address signals translated by the address adjuster to the first address bus. The internal R/W signal is also sent out to become the first R/W signal.

When the CPU executes a data write operation to the first bus, the CPU outputs internal data signals to the first data bus. In order to prevent the output data from signal collision over the first data bus, the CPU does not output the data when the clock signal is at its low level. When the CPU executes a data read operation from the first bus, the CPU fetches the first data signals into the internal data bus. The CPU core fetches the data signal at the falling edge of the CPU clock.

Figure 13:
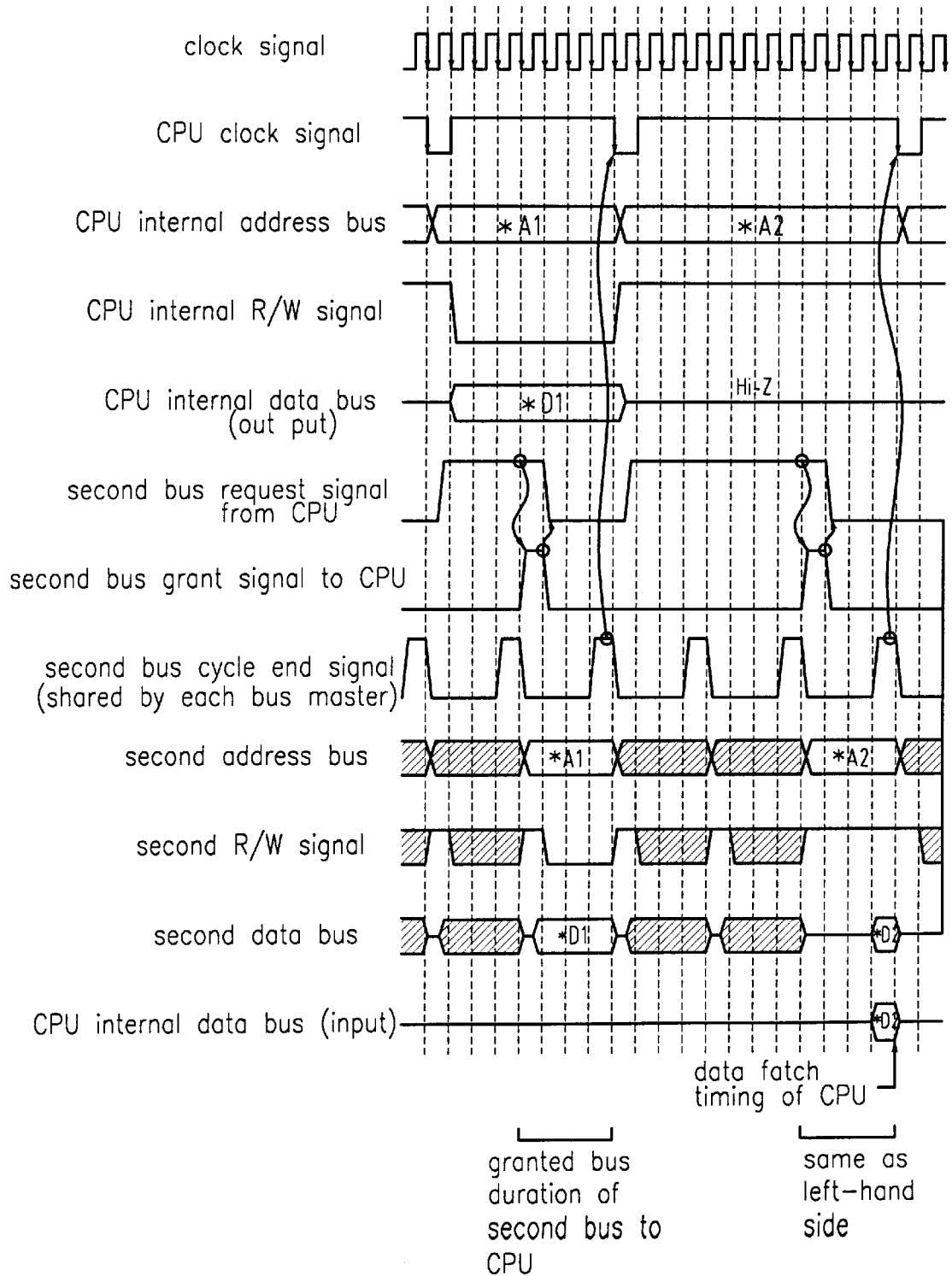
FIG. 13 illustrates an example of the timing chart of the second bus access procedure from the CPU shown in FIG. 9.

FIG. 13 shows an example of the timing chart of second bus access procedure from the CPU in FIG. 9. One bus cycle of the second bus equals to 2–8 clock cycles. The second bus arbitrator arbitrates the access of the second bus among the bus masters including the CPU at every bus cycle. The bus cycle length for each bus master is controlled by the bus cycle length controller in the external memory interface (not shown in the figure). The bus cycle length controller is connected to the first bus so that the CPU can control it through the first bus.

The address space of the second bus consists of two parts, second bus area A and second bus area B. Each bus area has an independent bus cycle length register. Therefore, each bus area can have an independent bus cycle length. For simplicity of explanation, in the example of FIG. 13, a bus cycle length of the area to which each bus master is accessing is always fixed to 4 clock cycles.

The CPU core issues logical address synchronized with the CPU clock signal. The address decoder determines whether the access corresponds to the second bus address space or not according to the issued logical address, the access valid signal and the memory mapping mode information. If the access corresponds to the second bus address space, the external second bus interface controller generates a second bus request signal to the second bus arbitrator according to the second bus area select signal from the address decoder.

The second bus arbitrator arbitrates the access of the second bus for each bus master having asserted a second bus request signal. It determines which bus master may use the next bus cycle. The second bus arbitrator then asserts the second bus grant signal to the bus master that is allowed to use the bus cycle. The second bus grant signal is active only for the first clock cycle in a bus cycle of the second bus. By obtaining the second bus grant signal, the bus master knows that it is granted to access the second bus. Then the bus master has the right to use the second bus until the bus cycle is ended by the bus cycle end signal. In the figure, one bus cycle of the second bus equals to 4 clock cycles. No two bus masters may access the second bus at the same time.

The clock controller controls to send or stop the clock signal to the CPU core. While the CPU is waiting for the second bus grant signal, the clock controller suspends supplying the clock signal to hold the CPU behavior. When the CPU gets the second bus grant signal, the clock controller resumes supplying the clock signal and releases the CPU.

While the CPU is granted to access the second bus, the CPU outputs the internal address signals translated by the address adjuster to the second address bus. The internal R/W signal is also sent out and becomes the second R/W signal.

When the CPU executes a data write operation to the second bus, the CPU outputs internal data signals to the second data bus. In order to prevent the output data from signal collision over the second data bus, the CPU does not output the data during the first clock cycle of the bus cycle when the clock signal is at its low level. When the CPU executes a data read operation from the second bus, the CPU fetches the second data signals into the internal data bus. The CPU core fetches the data signal at the falling edge of the CPU clock.

Figure 14:
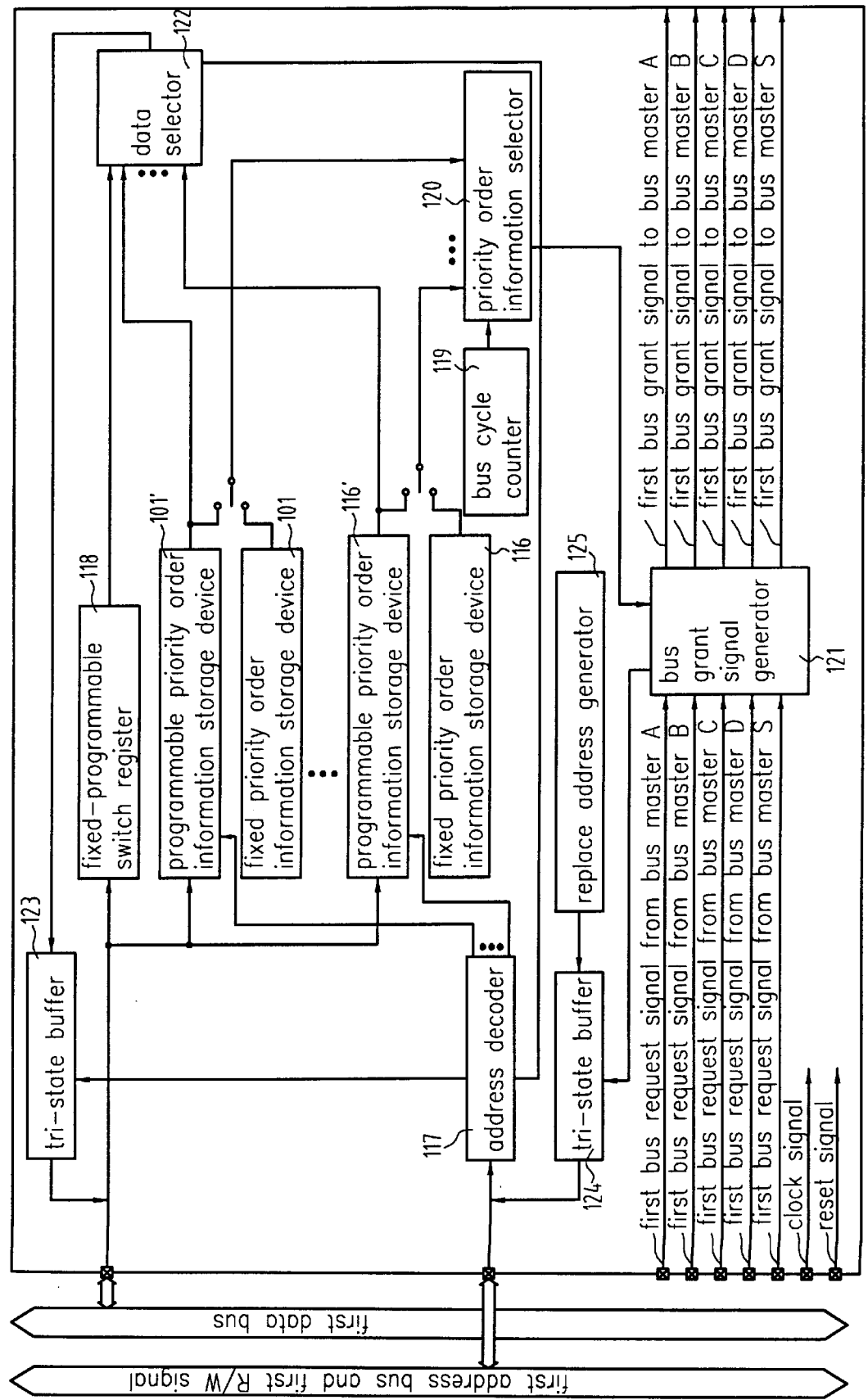
FIG. 14 illustrates the block diagram of a first bus arbitrator according to the present invention.
Figure 19:
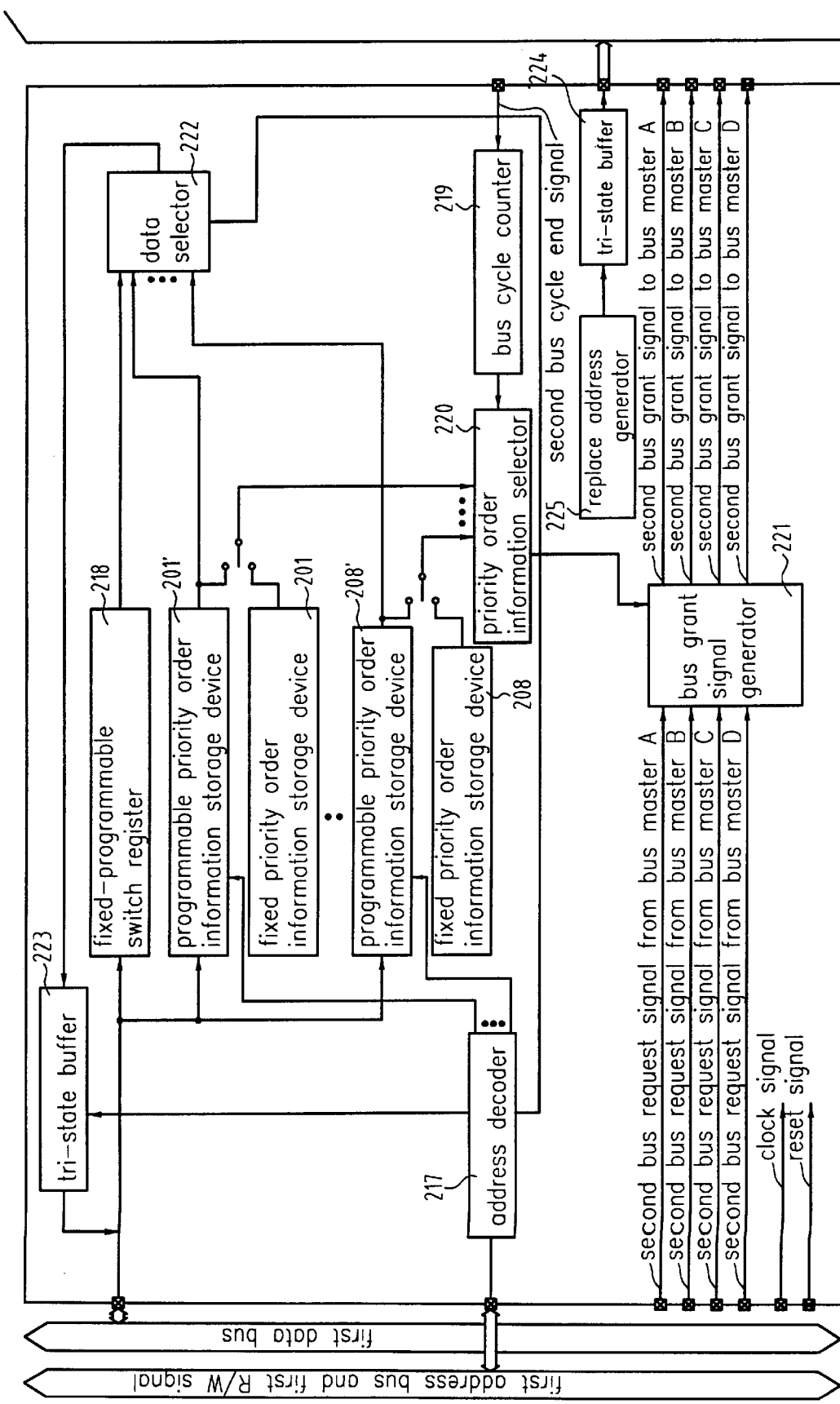
FIG. 19 illustrates the block diagram of a second bus arbitrator according to the present invention.

The two embodiments used as the first bus arbitration circuit 1306 and the second bus arbitration circuit 1307 in the high-speed processor for FIG. 8 are now described in detail. FIG. 14 and FIG. 19 show the block diagrams of the first bus arbitration circuit 1306 and the second bus arbitration circuit 1307 respectively based on the generalized design from the architecture of the bus arbitrators according to the present invention.

As shown in the embodiment of FIG. 14, four general bus masters A, B, C and D (not labeled in FIG. 14), and one privileged bus master S (refer to bus master S hereafter) need to get the bus cycle by arbitration for their execution. When the bus master S requests a first bus access, the bus arbitrator holds for one bus cycle to allow the bus master S to use the bus cycle. After having completed the execution of master S, the bus arbitrator will start again. On the other hand, when general bus masters A, B, C and D simultaneously request to access the first bus, the bus arbitrator asserts a first bus grant signal to the highest priority bus master for using the bus cycle. In general, DRAM refresh controller can be a privileged bus master, and processors such as CPU, a Picture Processor and a DMA controller are general bus masters.

In this embodiment, the first bus arbitrator arbitrates the access of the first bus comprising a first address bus, a first R/W signal and a first data bus. The bus arbitrator has build-in registers that are accessed through the first bus. The arbitration is done every bus cycle that equals to a clock cycle.

As mentioned earlier, the priority order information of bus masters in this invention may be fixed or programmable controlled by a fixed/programmable switch as shown in FIG. 7. FIG. 14 shows that the first bus arbitrator comprises sixteen fixed priority order information storage devices 101, 102, ..., 116 and sixteen programmable priority order information storage devices 101', 102', 103', ..., 116'. The arbitrator further comprises an address decoder 117, a fixed/programmable switch register 118, a bus cycle counter 119, a priority order information selector 120, a bus grant signal generator 121, a data selector 122, two tri-state buffers 123, 124 and a replace address generator 125.

The address decoder 117 decodes the first address signal and the first R/W signal, and generates select signals of the programmable priority order information storage devices 101', 102', 103', ..., 116', a control signal of the data selector 122 and a control signal of the tri-state buffers 123.

The fixed/programmable switch register 118 selects fixed priority order information storage devices 101, 102, ..., 116 or programmable priority order information storage devices 101', 102', 103', ..., 116' according to value set by a bus master such as CPU through the first bus. The programmable priority order information storage devices are build-in registers for storing programmable priority order information. The bus masters can access these registers through the first bus. Each fixed priority order information storage device stores 1 set of priority order information. These fixed storage devices are formed by wired logic, and the stored information is always fixed.

In this embodiment, only 2 bits are used for storing the priority order information. The 2 bits can represent 4 different priority order values. In practice, the number of bits is not limited to 2. It should be designed according to factors such as the number of bus masters need arbitration, the required types of priority order, the size of the arbitration circuit, and so on. Similarly, although both the number of the fixed priority order information storage devices and that of the programmable priority order information storage devices are shown as 16, the number is not limited to 16. It should also be designed according to factors such as the number of bus masters need arbitration, proportion of distribution of bus cycles to each bus master, the required types of priority order, the size of arbitration circuit, and so on.

The bus cycle counter 119 provides the count value that determines which priority order information is selected and the priority order information from the 16 priority order information storage devices are selected continuously and cyclically. Therefore, the maximum value of the content in the bus cycle counter 119 should equal to the number of priority order information storage devices. The priority order information selector 120 selects a set of priority order information from the 16 priority order information storage devices according to the current value of the bus cycle counter 119.

The bus grant signal generator 121 receives bus request signals from general bus masters A, B, C, D and privileged bus master S and asserts a bus grant signal to the highest priority bus master among them according to the priority order information selected by the priority order information selector. However, as pointed out earlier, if the privileged bus master S requests to access the first bus, the first bus arbitrator holds for one bus cycle to let the master S use a bus cycle. After having completed the execution of master S, the bus arbitrator will start again. The system in accordance with the present invention may not always have a privileged bus master. It depends on requirement of the system.

The data selector 122 selects data from registers 118 and 101'–116' according to the control signal generated by the address decoder 117. The tri-state buffers 123 output data selected by the data selector 122 to the first data bus according to the control signal generated by the address decoder 117. The tri-state buffers 124 output the address and the R/W signal sent by the replace address generator 125 to the first address bus and the first R/W signal when no bus master requests the first bus.

The bus arbitration procedure for the first bus arbitrator is now described. For simplicity, we assume that bus masters C and D do not issue bus request signals and only the arbitration between the two bus masters A and B to gain the access of the second bus for their execution is done by the arbitrator.

In this embodiment, a bus cycle equals to a clock cycle and the bus cycle counter 119 increases its count value by one every clock cycle. The count value in the bus cycle counter 119 is from 0 to 15 continuously and cyclically. At each bus cycle, the value in the bus cycle counter 119 determines which pair (X,X') of the priority order information from the priority order information storage devices (101,101'), (102,102'), . . . , (116,116') should be read out by the priority order information selector 120. And the fixed/programmable switch register 118 selects either the fixed or programmable priority order information.

In the embodiment, 2 bits are used as the priority order information code. The value in the 2 bits is from '0' to '3'. FIG. 15 shows an example of the arrangement of the priority order information for the embodiment. The arrangement shown in FIG. 15 is suitable for either the fixed mode or the programmable mode. FIG. 16 illustrates an example of assignment of priority order to each bus master A, B, C, and D for FIG. 15.

Figure 17:
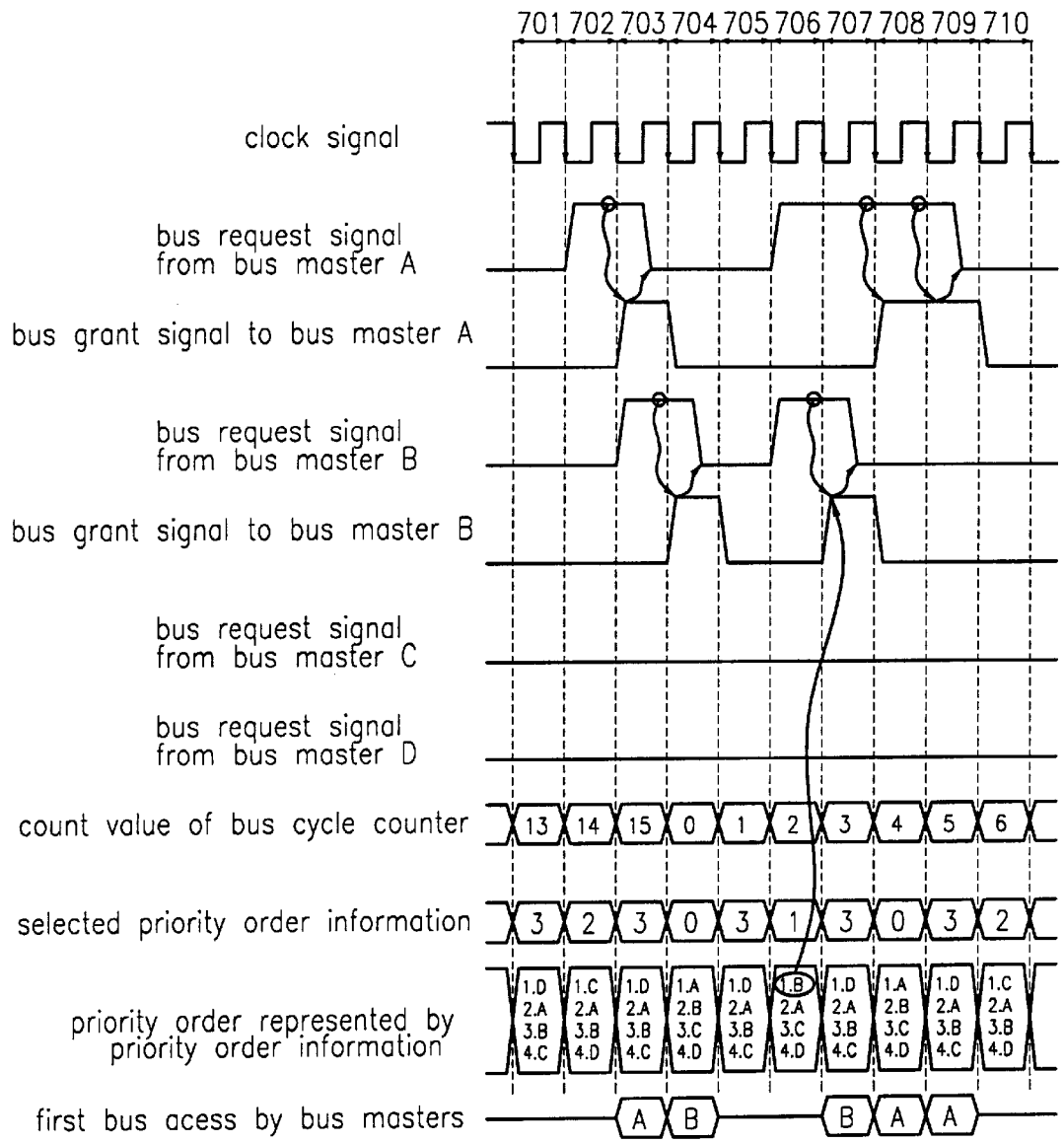
FIG. 17 illustrates an example of the timing chart of the bus arbitration procedure for the first bus arbitrator of FIG. 14.
Figure 18:
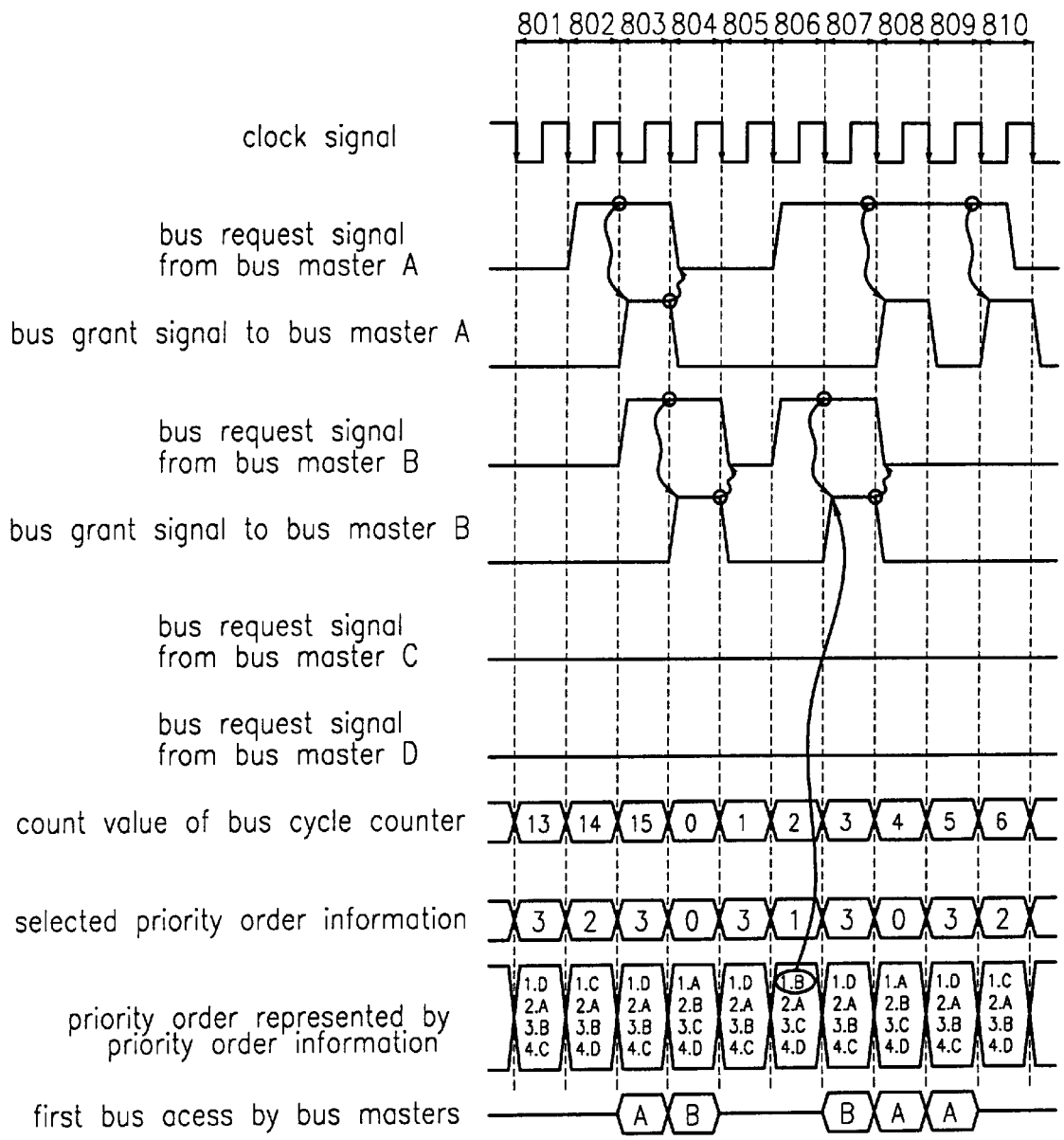
FIG. 18 illustrates another example of the timing chart of the bus arbitration procedure for the first bus arbitrator of FIG. 14.

FIG. 17 and FIG. 18 illustrate the timing charts of two different designs of the bus arbitration procedure for the first bus arbitrator in accordance with the present invention. The similarity and difference between the two designs can be seen from the timing charts. It is worth while to point out that the main difference is whether a bus master can negate its bus request signal immediately or not within the cycle that it gets the bus grant signal. The ability to negate the bus request signal immediately allows the bus master to issue the next bus request signal during that cycle if necessary.

As shown in the design of FIG. 17, a bus master can execute the above bus grant signal negation. One bus master can thus be granted the first bus two cycles in a row according to the design of FIG. 17. In contrast to FIG. 17, however, the design of FIG. 18 does not allow the bus master to execute such a bus grant signal negation immediately. Therefore, a bus master can not be granted the first bus two cycles continuously in accordance with the design of FIG. 18. Nevertheless, the arbitration circuit for this design is simpler and it is more efficient for high-speed circuits.

The identical part between the two designs can also be found from the timing charts of FIG. 17 and FIG. 18. When there is no bus master issuing a bus request signal, the bus arbitrator does not assert the bus grant signal. As shown in these two figures, neither bus master A nor B issues a bus request signal at its first bus cycle (701, 801), bus arbitrator does not assert the bus grant signal to bus master A or B at the next bus cycle (702,802).

If only one bus master issues a bus request signal, the bus arbitrator asserts the bus grant signal to the bus master. For example, only bus master A issues the bus request at the second bus cycle (702,802), bus arbitrator asserts bus grant signal to bus masters A at the next bus cycle (703,803). If more than one bus master issues a bus request signal to the bus arbitrator, the bus arbitrator asserts the bus grant signal to the highest priority bus master according to the assignment of priority order for each bus master such as those shown in FIG. 15 and FIG. 16. For example, bus masters A and B assert respective bus request signals at their sixth bus cycle (706,806), the bus arbitrator asserts bus grant signal to the highest priority bus master B at the next bus cycle (707,807).

A more detailed comparison between the timing charts of FIG. 17 and FIG. 18 is shown now. In the design for FIG. 17, a bus master having the bus grant signal can negate the bus request signal at the same bus cycle. If a bus master having the bus grant signal has negated the bus request signal while another bus master issues a bus request signal at the same bus cycle, it means that only the latter is requesting a bus cycle. Therefore, the requesting master will be given a bus grant signal at the next cycle. As shown in FIG. 17, bus master A has the bus grant signal at the third bus cycle 703 and negates the bus request signal before the end of the same cycle. Because bus master B issues a bus request signal at the third bus cycle, bus master B gets a bus grant signal at the next bus cycle 704.

In contrast to FIG. 17, a bus master having the bus grant signal cannot negate the bus request signal until the end of the same bus cycle in the design of FIG. 18. Therefore, the bus arbitrator always neglects the request signal from the same bus master at the same cycle so that another bus master can get a bus grant signal at the next cycle if it issues a bus request signal at that same cycle. As shown in FIG. 18, bus master A has the bus grant signal at the third bus cycle 803 but it cannot negate the bus request signal until the end of the same cycle. Bus master B issues a bus request signal at the third bus cycle 803. Therefore, the bus arbitrator neglects the bus request signal of bus master A and bus master B gets a bus grant signal at the next bus cycle 804.

In addition, in the design of FIG. 17, if a bus master asserts a bus request signal for continuous bus cycles, it is possible for the bus master to get a bus grant signal at continuous bus cycles. For example, in FIG. 17 bus master A issues a bus request signal and no other bus master issues a bus request signal at the seventh and eighth bus cycles (707, 708), then bus master A gets a bus grant signal at two continuous bus cycles (708, 709).

In contrast to the FIG. 17, however, one bus master in the design of FIG. 18 cannot get a bus grant signal for continuous bus cycles. For example, in FIG. 18, bus master A gets a bus grant signal at the eighth bus cycle 808, then the bus arbitrator neglects the bus request signal asserted by bus master A at the eighth bus cycle 808. Therefore, bus master A can only get a bus grant signal at the $10^{th}$ bus cycle 810 although no other bus master is granted the ninth bus cycle 809.

In the following, the bus arbitration for the second bus arbitrator shown in FIG. 19 will be described. For simplicity, it is still assumed that four general bus masters A, B, C and D need arbitration to get bus cycles. In this embodiment, the second bus arbitrator arbitrates the second bus comprising a second address bus, a second R/W signal and a second data bus. The arbitrator has build-in registers that are accessed though the first bus. The arbitration is executed every bus cycle in which a bus cycle equals to 2–8 clock cycles.

With reference to FIG. 19, the second bus arbitrator circuit comprises an address decoder 217, a fixed/programmable switch register 218, eight fixed priority order information storage devices 201, 202, . . . , 208, eight programmable priority order information storage devices 201', 202', 203', . . . , 208', a bus cycle counter 219, a priority order information selector 220, a bus grant signal generator 221, a data selector 222, two tri-state buffers 223, 224 and a replace address generator 225.

The size of the second bus arbitration circuit is much smaller than that of the first bus arbitration circuit in FIG. 14 because only eight sets of programmable information storage devices and fixed information storage devices are included. Although both the number of the fixed priority order information storage devices and that of the programmable priority order information storage devices are illustrated as eight, the number is not limited to eight. According to factors such as the number of bus masters, the required types of priority order, the size of the arbitration circuit and so on, the number can be designed to satisfy the requirement.

Figure 20:
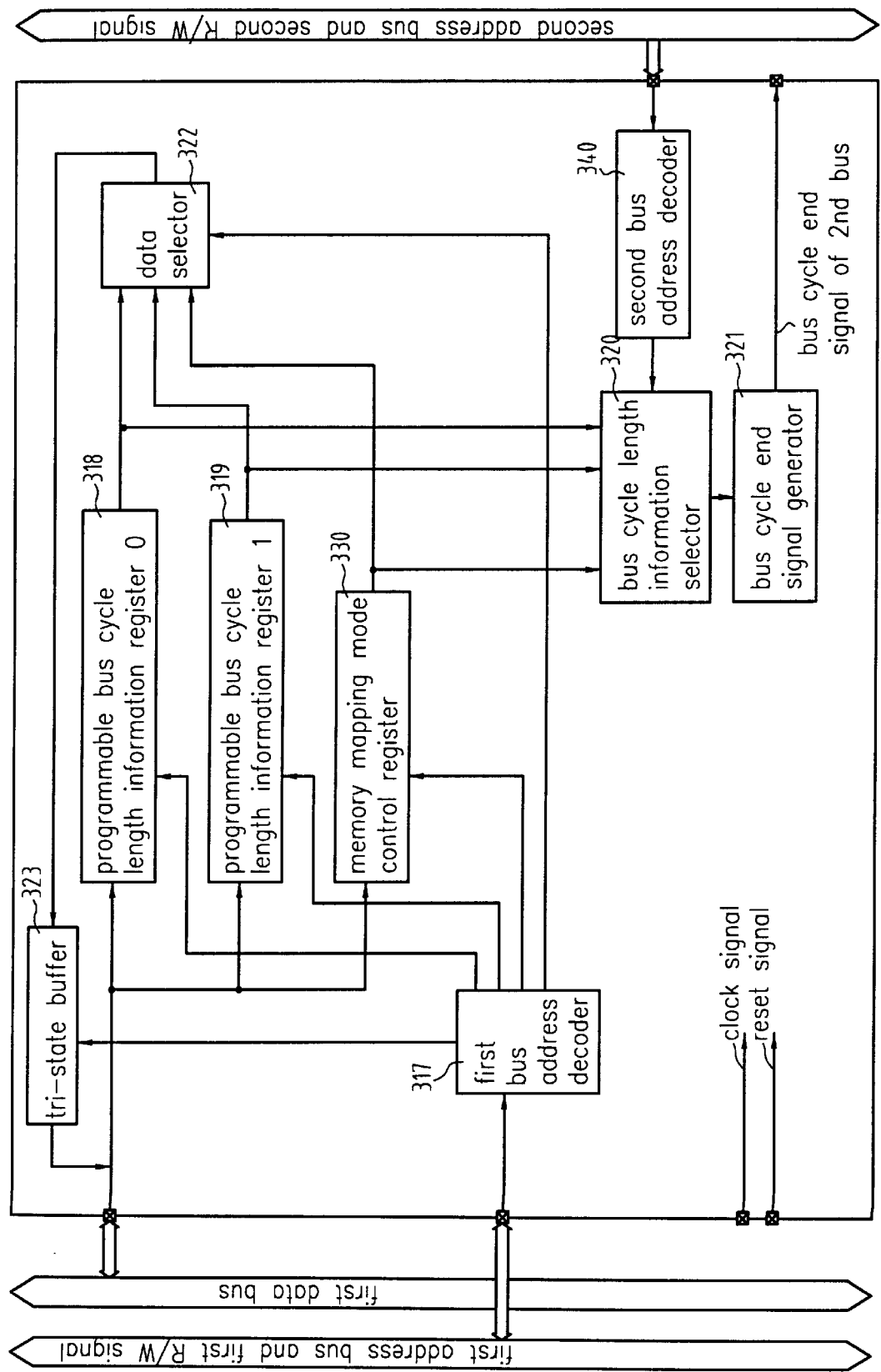
FIG. 20 illustrates the block diagram of a bus cycle length controller of the present invention.

The bus arbitration system in the second embodiment includes not only the second bus arbitrator shown in FIG. 19 but also the bus cycle length controller shown in FIG. 20. In this embodiment, the physical address space of the second bus is separated into two parts and the bus cycle length controller controls the bus cycle length for each part of the address space independently.

The bus cycle length controller comprises two sets of programmable bus cycle length information registers 318, 319, a bus cycle length information selector 320, a bus cycle end signal generator 321 and a memory mapping mode control register 330. Each of the programmable bus cycle length information registers 318, 319 stores the bus cycle length information of one corresponding area of the address space. The bus cycle length information selector 320 selects a certain bus cycle length information from the value stored in register 318 or 319 according to the address sent by the bus master and memory mapping mode information controlled by the memory mappoing mode control register. The bus cycle end signal generator 321 generates a bus cycle end signal according to the selected bus cycle length information. The bus cycle length controller further comprises a first bus address decoder 317, a set of tri-state buffers 323, a data selector 322 and a second bus address decoder 340.

The second bus arbitrator shown in FIG. 19 arbitrates the access of the second bus among all the bus masters. The bus grant signal generator 221 receives second bus request signals from bus masters that need to access the second bus. According to the priority order information sent from the priority order information selector 220, the bus grant signal generator 221 asserts a second bus grant signal to the highest priority bus master. When none of the bus masters A, B, C and D has a second bus request, the tri-state buffers 224 output the address and the R/W signal generated by the replace address generator 225 to the second address bus and the second R/W signal.

FIG. 21 illustrates an example of the timing chart of the bus arbitration procedure for the second bus arbitrator in accordance with the present invention. For simplicity, we assume that bus masters C and D do not issue the bus request signal and only the arbitration between the two bus masters A and B to gain the access of the second bus for their execution is done by the arbitrator.

In this embodiment, the bus cycle length is controlled by the bus cycle length controller. The range for the bus cycle length can be set form 2 to 8 clock cycles. This bus cycle length controller sends a bus cycle end signal to the bus masters and the bus arbitrator to inform them of the end of the bus cycle.

As mentioned before, the address space of the second bus is divided into two areas having independent bus cycle lengths. In this example, bus master A is accessing one area that has a bus cycle length of 4 clock cycles. And bus master B is accessing the other area that has a bus cycle length of 2 clock cycles. It should also be noted that the bus cycle length is controlled to 1 clock cycle when no bus master requests the second bus access.

The bus grant signal becomes active at the first clock cycle of a given bus cycle for the bus master to gain the bus access until the bus cycle is ended by the bus cycle end signal. In the bus cycle, the bus cycle end signal is active only at the last clock cycle if the second bus is accessed by a bus master. However, it becomes active when no master is accessing the second bus. This bus cycle end signal is a common signal to all bus masters.

In this embodiment, a bus cycle counter 219 increases its count value by one at every bus cycle. The count value is from 0 to 7 continuously and cyclically. At each bus cycle, the value in the bus cycle counter 219 determines which of the priority order information from the priority order information storage devices (201, 201'), (202, 202'), . . . , (208, 208') should be read out by the priority order information selector 220. And the fixed/programmable switch register 218 selects the desired fixed or programmable priority order information.

Two bits are used for the priority order information. Therefore, the value represented by the two bits is from '0' to '3'. FIG. 22 shows an example of the arrangement of priority order information for this embodiment. The arrangement can be applied to either the fixed priority order information mode or the programmable mode. The value of the priority order information represents assignment of the priority order for all bus masters. As discussed before, FIG. 16 discussed earlier is an example of such assignment.

When no bus master requests the access to the second bus, the second bus arbitrator does not assert any second bus grant signal. With reference to FIG. 21, the bus arbitrator does not assert any second bus grant signal because no bus master issues a second bus request at the first bus cycle 901. Therefore, in the next bus cycle 902, neither bus master A nor bus master B is granted the access of the second bus.

If only one bus master issues a second bus request signal, the second bus arbitrator asserts the bus grant signal to the requesting bus master for accessing the second bus in the next bus cycle. The bus master may have the access of the second bus until the end of the next bus cycle controlled by the bus cycle end signal. For example, in FIG. 21, only bus master A issues a second bus request signal at the bus cycle 902 and the bus arbitrator asserts the second bus grant signal to bus master A for the next bus cycle 903. Bus master A, therefore, has the second bus access during bus cycle 903 until the end of that bus cycle.

If more than one bus master issues a bus request signal, the bus arbitrator asserts a bus grant signal to the highest priority bus master according to the assignment of the priority order information. For example, bus masters A and B both issue bus request signals at the sixth bus cycle 906. The second bus arbitrator asserts the bus grant signal to the bus master B for the next bus cycle 907 because the priority of bus master B is higher than that of bus master A based on the priority order information read in the bus cycle 906.

In this embodiment, every bus master negates the bus request signal after it gets the bus grant signal. The bus master can issue another bus request signal in the next clock cycle if necessary. In this example, the shortest length of a bus cycle given to bus masters equals to 2 clock cycles. Therefore, every bus master can complete the above execution before the next bus cycle begins. This means that it is possible for a bus master to get continuous bus cycles.

For example, in FIG. 21, bus master A has a bus access in the cycle 908 and issues the next bus request signal at the end of this cycle. The bus arbitrator recognizes the bus request signal as the next one. In the mean time, no other bus master requests the bus in this cycle. Therefore bus master A gets the next cycle 909 continuously.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. A system constructed on a single semiconductor chip, comprising:
    a plurality of buses each having an independent address bus, an independent data bus and individual data transfer capability;
    at least one bus master having a plurality of independent bus interfaces directly connected to said plurality of buses, each of said plurality of independent bus interfaces being connected to one of said plurality of buses; and
    a plurality of bus slaves each having individual data transfer capability and being connected to one of said plurality of buses having corresponding data transfer capability.

2. The system according to claim 1, wherein each of said plurality of buses has an independent physical address space being mapped onto a portion of a unified logical address space of said bus master and said bus master further comprises:
    a logical address generator for issuing a logical address;
    an address decoder for decoding the issued logical address and determining which physical address space the issued logical address corresponds to; and
    an address adjuster for translating the issued logical address into the physical address of a corresponding bus.

3. The system according to claim 1, wherein at least one of said plurality of buses further has an associated bus cycle length controller and an independent physical address space being divided into a plurality of physical address space sections each having a bus cycle length, said bus cycle length controller further comprising:
    a plurality of bus cycle length information storage devices each storing the bus cycle length information of a physical address space section;
    a bus cycle length information selector for selecting certain bus cycle length information from said plurality of bus cycle length information storage devices according to which physical address space section a requested bus access corresponds to; and
    a bus cycle end detector for detecting a bus cycle end according to said bus cycle length information selected by said bus cycle length information selector;
    wherein said bus cycle length controller controls the length of a bus cycle of the associated bus according to which physical address space section the requested bus access corresponds to.

4. The system according to claim 1, wherein said plurality of bus slaves include higher-speed bus slaves and lower-speed bus salves, and said plurality of buses include:
    a first bus for handling data transfer and exchange between said bus master and said higher-speed bus slaves; and
    a second bus for handling data transfer and exchange between said bus master and said lower-speed bus slaves.

5. The system according to claim 4, wherein said bus master is a central processor and said plurality of bus slaves include at least one sound controller for processing sound transactions and generating an audio signal.

6. The system according to claim 5, wherein said plurality of bus slaves further include at least one picture controller for processing graphics transactions and generating a video signal.

7. A system constructed on a single semiconductor chip, comprising:
    a plurality of buses each having an independent address bus, an independent data bus and individual data transfer capability;
    a plurality of independent bus arbitrators each being associated with one of said plurality of buses;
    a plurality of bus masters each having a plurality of independent bus interfaces directly connected to said plurality of buses, each of said plurality of independent bus interfaces being connected to one of said plurality of buses; and
    a plurality of bus slaves each having individual data transfer capability and being connected to one of said plurality of buses having corresponding data transfer capability;
    wherein each of said plurality of bus masters is capable of issuing an independent bus request signal for the access of a desired bus, and the independent bus arbitrator associated with said desired bus arbitrates among bus masters that issue bus request signals for the access of said desired bus, and sends a bus grant signal to one of the requesting bus masters for accessing said desired bus.

8. The system according to claim 7, wherein each of said plurality of independent bus interfaces comprises:
    tri-state buffers for controlling whether to output an address to the address bus of the connected bus or not;
    bi-directional tri-state buffers for controlling whether to pass internal data to the data bus of the connected bus or not, and controlling data transfer over the data bus; and
    a control means for controlling said tri-state buffers and said bi-directional tri-state buffers according to a bus grant signal sent by the associated bus arbitrator of the connected bus.

9. The system according to claim 7, wherein at least one of said plurality of independent bus arbitrators arbitrates among a plurality of bus masters according to an arbitration procedure comprising the steps of:
    receiving bus request signals from bus masters requesting the access of the associated bus, each of said bus request signals being issued by a bus master in synchronization with a clock cycle;
    determining which bus master may use the next bus cycle at the end of a current bus cycle; and asserting a bus grant signal to the bus master allowed to use the next bus cycle;

wherein said arbitration procedure is accomplished without wasting a bus cycle.

10. The system according to claim 7, wherein each of said plurality of buses has an independent physical address space being mapped onto a portion of a unified logical address space of at least one of said plurality of bus masters and the one bus master further comprises:

a logical address generator for issuing a logical address;

an address decoder for decoding the issued logical address and determining which physical address space the issued logical address corresponds to; and an address adjuster for translating the issued logical address into the physical address of a corresponding bus.

11. The system according to claim 7, wherein at least one of said plurality of buses further has an associated bus cycle length controller, and an independent physical address space being divided into a plurality of physical address space sections each having a bus cycle length, said bus cycle length controller further comprising:

a plurality of bus cycle length information storage devices each storing the bus cycle length information of a physical address space section;

a bus cycle length information selector for selecting certain bus cycle length information from said plurality of bus cycle length information storage devices according to which address space section a requested bus access corresponds to; and a bus cycle end detector for detecting a bus cycle end according to said bus cycle length information selected by said bus cycle length information selector;

wherein said bus cycle length controller controls the length of a bus cycle of the associated bus according to which address space section the requested bus access corresponds to.

12. The system according to claim 7, each of said plurality of independent bus arbitrators further comprising:

a plurality of priority order information storage devices each storing a set of priority order information comprising assignment of access priority order for all bus masters;

a priority order information selector for cyclically selecting every set of priority order information from said priority order information storage devices, each set of priority order information being selected in one bus cycle; and a bus grant generator for sending a bus grant signal to the highest priority bus master among bus masters that issue bus request signals according to the priority order information selected by said priority order information selector;

wherein said highest priority bus master is allowed to access the associated bus for one bus cycle.

13. The system according to claim 12, wherein at least one of said plurality of independent bus arbitrators arbitrates among a plurality of bus masters according to an arbitration procedure comprising the steps of:

receiving bus request signals from bus masters requesting the access of the associated bus, each of said bus request signals being issued by a bus master in synchronization with a clock cycle;

determining which bus master may use the next bus cycle at the end of a current bus cycle according to selected set of priority order information; and asserting a bus grant signal to the bus master allowed to use the next bus cycle.

14. The system according to claim 12, wherein said priority order information stored in each of said plurality of priority order information storage devices is fixed.

15. The system according to claim 12, wherein said priority order information stored in each of said plurality of priority order information storage devices is programmable.

16. The system according to claim 15, wherein each of said plurality of buses has an independent physical address space and at least one of said plurality of bus masters further comprises:

a unified logical address space, said physical address space of a bus being mapped onto a portion of said unified logical address space;

a logical address generator for issuing a logical address;

an address decoder for decoding the issued logical address and determining which physical address space the issued logical address corresponds to; and an address adjuster for translating the issued logical address into the physical address of a corresponding bus.

17. The system according to claim 15, wherein at least one of said plurality of buses further has an associated bus cycle length controller, and an independent physical address space being divided into a plurality of physical address space sections each having a bus cycle length, said bus cycle length controller further comprising:

a plurality of bus cycle length information storage devices each storing the bus cycle length information of an physical address space section;

a bus cycle length information selector for selecting certain bus cycle length information from said plurality of bus cycle length information storage devices according to which address space section a requested bus access corresponds to; and a bus cycle end detector for detecting a bus cycle end according to said bus cycle length information selected by said bus cycle length information selector;

wherein said bus cycle length controller controls the length of a bus cycle of the associated bus according to which address space section the requested bus access corresponds to.

18. The system according to claim 15, wherein said plurality of buses include:

a first bus for handling data transfer and exchange between said plurality of bus masters and higher-speed bus slaves of said plurality of bus slaves; and a second bus for handling data transfer and exchange between said bus master and lower-speed bus slaves of said plurality of bus slaves;

and said plurality of independent bus arbitrators include:

a first bus arbitrator for arbitrating the access of said first bus; and a second bus arbitrator for arbitrating the access of said second bus.

19. The system according to claim 18, wherein said plurality of bus masters include:

at least one central processor; and at least one sound processor for processing sound transactions and generating an audio signal.

20. The system according to claim 19, wherein said plurality of bus masters include:

at least one picture processor for processing graphic transactions and generating a video signal.

21. The system according to claim 12, each of said plurality of independent bus arbitrators further comprising a fixed/programmable switching means, and said plurality of priority order information storage devices being replaced by:

a plurality of fixed priority order information storage devices each storing a set of fixed priority order information comprising assignment of access priority order for all bus masters; and a plurality of programmable priority order information storage devices each storing a set of programmable priority order information comprising assignment of access priority order for all bus masters;

wherein said fixed/programmable switching means selects either said plurality of fixed priority order information storage devices or said plurality of programmable priority order information storage devices for providing priority order information.

\* \* \* \* \*